(12) United States Patent
Tsukamoto

(10) Patent No.: US 8,127,026 B2
(45) Date of Patent: Feb. 28, 2012

(54) USER OPERATION ACTING DEVICE, USER OPERATION ACTING PROGRAM, AND COMPUTER READABLE RECORDING MEDIUM

(75) Inventor: Ryota Tsukamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 694 days.

(21) Appl. No.: 12/209,645

(22) Filed: Sep. 12, 2008

(65) Prior Publication Data

US 2009/0222819 A1 Sep. 3, 2009

(30) Foreign Application Priority Data

Mar. 1, 2008 (JP) ................................. 2008-051453

(51) Int. Cl.
*G06F 15/16* (2006.01)

(52) U.S. Cl. .................. 709/228; 709/246; 709/250

(58) Field of Classification Search .................. 709/217, 709/246, 228
See application file for complete search history.

(56) References Cited

U.S. PATENT DOCUMENTS

| 7,502,754 B2* | 3/2009 | Campbell et al. ............... 705/35 |
| 7,511,842 B2* | 3/2009 | Mihira ........................ 358/1.15 |
| 2002/0032706 A1* | 3/2002 | Perla et al. .................... 707/530 |
| 2002/0038349 A1* | 3/2002 | Perla et al. .................... 709/217 |
| 2002/0054090 A1* | 5/2002 | Silva et al. .................... 345/747 |

FOREIGN PATENT DOCUMENTS

| JP | 2000-148679 | 5/2000 |
| JP | 2001-256056 | 9/2001 |
| JP | 2004-246747 | 9/2004 |
| JP | 2004-302725 | 10/2004 |

\* cited by examiner

*Primary Examiner* — Douglas Blair
(74) *Attorney, Agent, or Firm* — Oblon, Spivak, McClelland, Maier & Neustadt, L.L.P.

(57) ABSTRACT

A wrapper 300 includes a message processing function 310 which receives a processing request for requesting a process for an existing Web system 500, an execution definition storing unit 410 which stores execution definition 400 corresponding to the processing request and defines user operation for the existing Web system 500, a definition executing engine 320 which reads the execution definition 400 corresponding to a processing request from the execution definition storing unit 410, based on definition of user operation shown by the execution definition 400, generates and outputs an operating request to instruct to operate a browser engine for the existing Web system 500, and a browser engine operating function 330 which inputs the operating request from the definition executing engine 320, generates the browser engine 340, and operates the generated browser engine according to the operating request inputted.

4 Claims, 31 Drawing Sheets

400 : EXECUTION DEFINITION

```
function operation1(keyword)
{
    var browser;

browser = new Browser();
    browser.load("http://sample.system/search");

browser.click("SEARCH ○○");

browser.input("KEYWORD", keyword);
    browser.click("SEARCH");

var value = browser.getCell(2, 2);

return value;
}
```

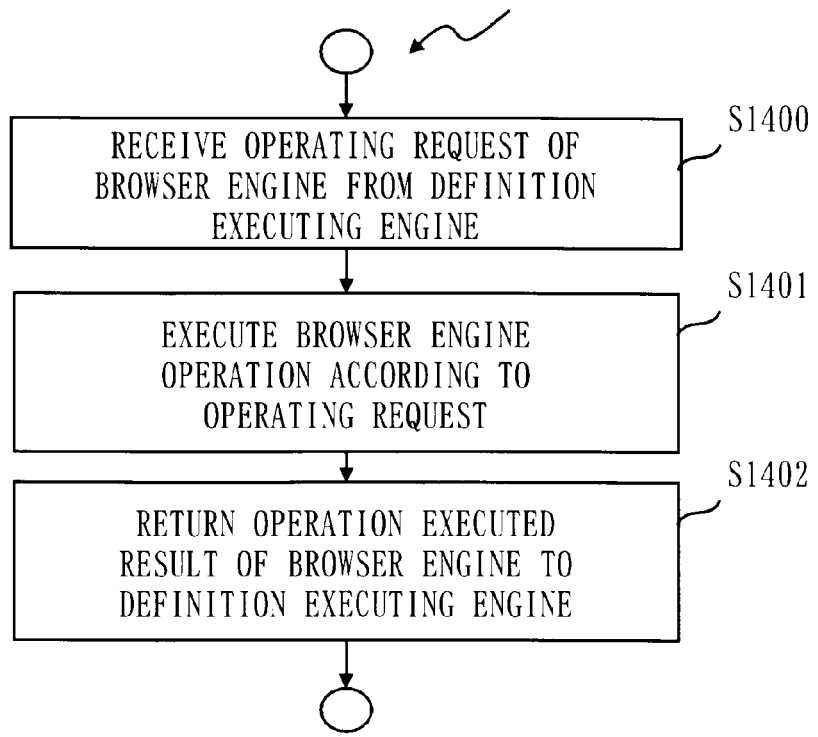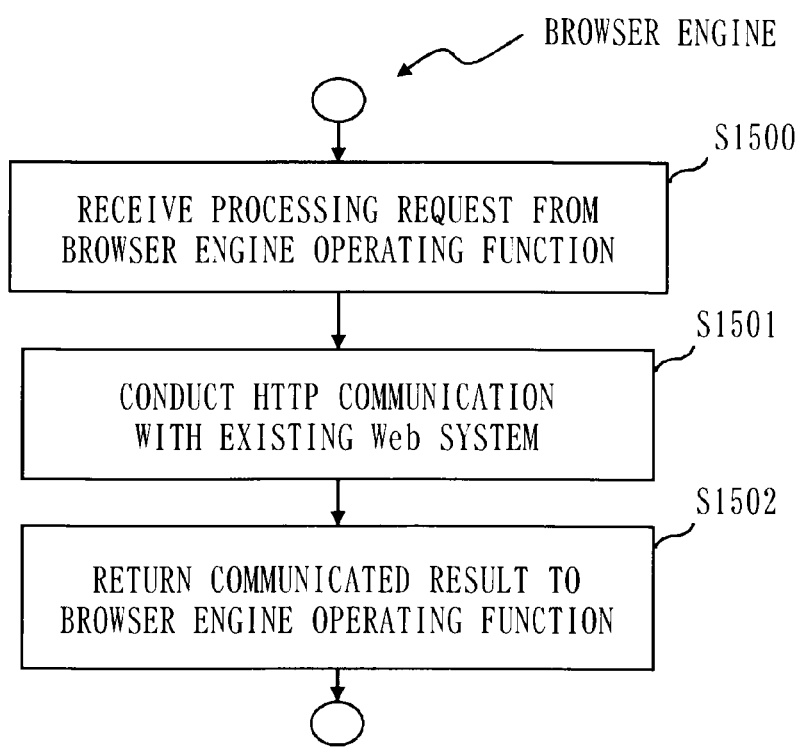

Fig. 17

400 : EXECUTION DEFINITION

```
var oo_browser;
var xx_browser;
var flg_init = false;

function init()
{
    oo_browser = new Browser();
    oo_browser.load("http://sample.system/search");

oo_browser.click("SEARCH ○○");

xx_browser = new Browser();
    xx_browser.load("http://sample.system/search");

xx_browser.click("SEARCH ××");

flg_init = true;
} function operation2(keyword, separator)
{
    oo_browser.input("KEYWORD", keyword);
    oo_browser.click("SEARCH");

var oo_value = oo_browser.getCell(2, 2);

xx_browser.input("KEYWORD", keyword);
    xx_browser.click("SEARCH");

var xx_value = xx_browser.getCell(2, 2);

flg_init = false;

return oo_value + separator + xx_value;
}
```

Fig. 23

400 : EXECUTION DEFINITION

```
var browser = 0;

function operation3(username, password, keyword)
{
    if (browser == 0)
    {
        browser = new Browser();
    } browser.load("http://sample.system/search");

if (browser.getTitle() == "LOGIN SCREEN")
    {
        browser.input("USERNAME", username);
        browser.input("PASSWORD", password);
        browser.click("LOGIN");
    } browser.click("SEARCH ○○");

browser.input("KEYWORD", keyword);
    browser.click("SEARCH");

var value = browser.getCell(2, 2);

return value;
}
```

Fig. 32

400 : EXECUTION DEFINITION

```
var flg_init = false;
var scr_search;
var scr_regist;

function operation4(username, password, keyword, info)
{
    var browser;

if (flg_init == false)
    {
        browser = new Browser();
        browser.load("http://sample.system/login");

browser.input("USERNAME", username);
        browser.input("PASSWORD", password);
        browser.click("LOGIN");

browser.click("SEARCH FLOW");
        browser.click("SEARCH ○○");

scr_search = browser.clone();

browser.input("KEYWORD", keyword);
        browser.click("SEARCH");

var value = browser.getCell(2, 2);

browser.click("BACK TO TOP MENU");
        browser.click("REGSTRATION FLOW");
        browser.click("REGISTER YY");

scr_regist = browser.clone();

browser.input("ITEM 1", info);
        browser.input("ITEM 2", value);
        browser.click("REGISTER");

flg_init = true;
    }
    else
    {
        browser = scr_search.clone();

browser.input("KEYWORD", keyword);
        browser.click("SEARCH");

var value = browser.getCell(2, 2);

browser = scr_regist.clone();

browser.input("ITEM 1", info);
        browser.input("ITEM 2", value);
        browser.click("REGISTER");
    } return browser.getPage();
}
```

USER OPERATION ACTING DEVICE, USER OPERATION ACTING PROGRAM, AND COMPUTER READABLE RECORDING MEDIUM

BACKGROUND OF THE INVENTION

1. Field of the Invention

The present invention relates to a Web system wrapping device (a user operation acting device) for wrapping an existing Web system and a user operation acting program.

2. Discussion of the Background

In case of constructing a new system by reutilizing functions included in an existing system, a wrapping method is used such as protocol conversion, etc. in order to adapt the functions intended to be reutilized to interface of the new system. This is called screen wrapping particularly when a target for reutilizing is a Web screen.

In order to intend to serve existing resource by screen wrapping of the existing Web system, generally, emulation program has been generated or a browser engine has been utilized for acting screen transitions and input process which is a servicing target.

However, in case that a single program executes screen transition process of the existing Web system, when the number of screen transitions is large, when there exists a screen which takes time to load according to a large amount of image data, or when script processing within the screen takes time, it also takes time to do response as the wrapped service.

In order to solve the above problems, plural emulation programs are prepared, and an emulation program, in which a screen can move to a targeted screen in the shortest time, can be selected using a time required for screen transition of the existing Web system and a transition method which have been researched beforehand and a processing request is issued (Patent Document 1, for example).

LIST OF REFERENCES

[1] JP2004-302725

In the wrapping method to speed up using conventional plural programs, there is a problem that a new system construction requires many steps, since it is necessary to research a time and a transition method for screen transition of the existing Web system.

Further, there is another problem that it is impossible to wrap operation including plural screens, since cooperation between programs cannot be conducted.

Further, there is another problem that user authentication is necessary for all programs if the existing system requires user authentication.

SUMMARY OF THE INVENTION

The present invention aims: to reduce research contents for the existing Web system as much as possible; to enable to wrap operation including plural screens; and to speed up response time of a wrapped service by improving efficiency of the process even if the user authentication is required.

According to the present invention, a user operation acting device includes: a processing request receiving unit, a definition executing unit, and a browser engine operating unit. The process request receiving unit is for receiving a processing request for requesting a process for a predetermined system device. The definition executing unit is for reading, from an execution definition storing unit that stores an execution definition which corresponds to the processing request received by the processing request receiving unit and defines user operation for the predetermined system device, the execution definition corresponding to the processing request, for generating a browser operation instructing signal to instruct to operate a browser engine corresponding to the predetermined system device based on a definition of the user operation shown by the execution definition read, and for outputting the browser operation instructing signal generated. The browser engine operating unit is for acting as the user operation for the predetermined system device by inputting the browser operation instructing signal outputted by the definition executing unit, generating a browser engine when the browser operation instructing signal is inputted, and operating the browser engine generated according to the browser operation instructing signal.

The execution definition stored in the execution definition storing unit defines, as the definition of the user operation, an initialization process including generation of a plurality of browser engines and predetermined initialization for each of the plurality of browser engines generated and an execution process using each of the plurality of browser engines initialized. The definition executing unit reads definition of the initialization process from the execution definition storing unit at a predetermined timing, based on the definition of the initialization process read, generates a browser initialization processing signal to instruct the browser engine operating unit to operate a browser engine corresponding to the initialization process as a browser operation instructing signal, and outputs the browser initialization processing signal generated. The browser engine operating unit inputs the browser initialization processing signal outputted by the definition executing unit, generates the plurality of browser engines when the browser initialization processing signal is inputted, and according to the browser initialization processing signal, makes each of the browser engines generated execute the predetermined initialization process. The definition executing unit reads definition of the execution process from the execution definition storing unit, based on the definition of the execution process read, generates a browser execution processing signal to instruct the browser engine operating unit to operate a browser engine corresponding to the execution process as the browser operation instructing signal, and outputs the browser execution processing signal generated to the browser engine operating unit after outputting the browser initialization processing signal The browser engine operating unit inputs the browser execution processing signal outputted by the definition executing unit, according to the browser execution processing signal, operates each of the plurality of browser engines.

According to another aspect of the present invention, a user operation acting device includes: a session managing unit, a processing request receiving unit, and a browser engine operating unit. The session managing unit is for storing and managing as a session management target a set of an execution logic which is an instance of user operation logic defining user operation for a predetermined system device and a browser engine instance which is an instance of a browser engine executing user operation of the execution logic by corresponding to a session ID (IDentification) identifying a session. The processing request receiving unit is for receiving a processing request for requesting a process for the predetermined system device and including a session ID, requesting the session managing unit to obtain the session management target managed by a same session ID as the session ID included in the processing request received, and when the session management target is obtained from the session managing unit, requesting the execution logic included in the session management target obtained to process. The browser engine operating unit is for operating a browser engine according to a browser operation instructing signal to instruct to operate the browser engine The execution logic which is requested to process by the processing request receiving unit generates the browser operation instructing signal based on definition of the user operation of the execution logic which is itself, and outputs the browser operation instructing signal generated to the browser engine operating unit The browser engine operating unit acts as the user operation for the predetermined system device by inputting the browser operation instructing signal from the execution logic, and operates the browser engine instance obtained by the session managing unit according to an instruction of the browser operation instructing signal inputted.

The execution logic defines as the user operation at least a first process for the predetermined system device and a second process, in which a same browser engine instance as a browser engine instance used for the first process is used, to be executed after the first process, and the browser engine operating unit copies the browser engine instance with a predetermined status in the first process and uses the browser engine instance copied for the second process.

According to another aspect of the present invention, a user operation acting program causes a computer to execute processes of: receiving a processing request requesting a process for a predetermined system device; reading, from an execution definition storing unit storing execution definition which corresponds to the processing request received and defines user operation for the predetermined system device, the execution definition corresponding to the processing request, generating a browser operation instructing signal to instruct to operate a browser engine corresponding to the predetermined system device based on the definition of the user operation shown by the execution definition read, and outputting the browser operation instructing signal generated The user operation acting program causes the computer to act as the user operation for the predetermined system device by inputting the browser operation instructing signal outputted, generate a browser engine when the browser operation instructing signal is inputted, and operate the browser engine generated according to the browser operation instructing signal.

According to another aspect of the present invention, a computer readable recording medium stores the user operation acting program.

BRIEF DESCRIPTION OF THE DRAWINGS

A complete appreciation of the present invention and many of the attendant advantages thereof will be readily obtained as the same becomes better understood by reference to the following detailed description when considered in connection with the accompanying drawings, wherein:

FIG. 10 is a flowchart of a browser engine operating function 330 according to the first embodiment;

FIG. 11 is a flowchart of a browser engine 340 according to the first embodiment;

FIG. 17 shows execution definition 400 which defines user operation in the flow of user operation of FIG. 16;

FIG. 23 shows execution definition 400 which defines user operation in the flow of user operation of FIG. 22;

FIG. 32 shows execution definition 400 which defines user operation in the flow of user operation of FIG. 29.

DESCRIPTION OF THE PREFERRED EMBODIMENTS

Embodiment 1

Figure 1:
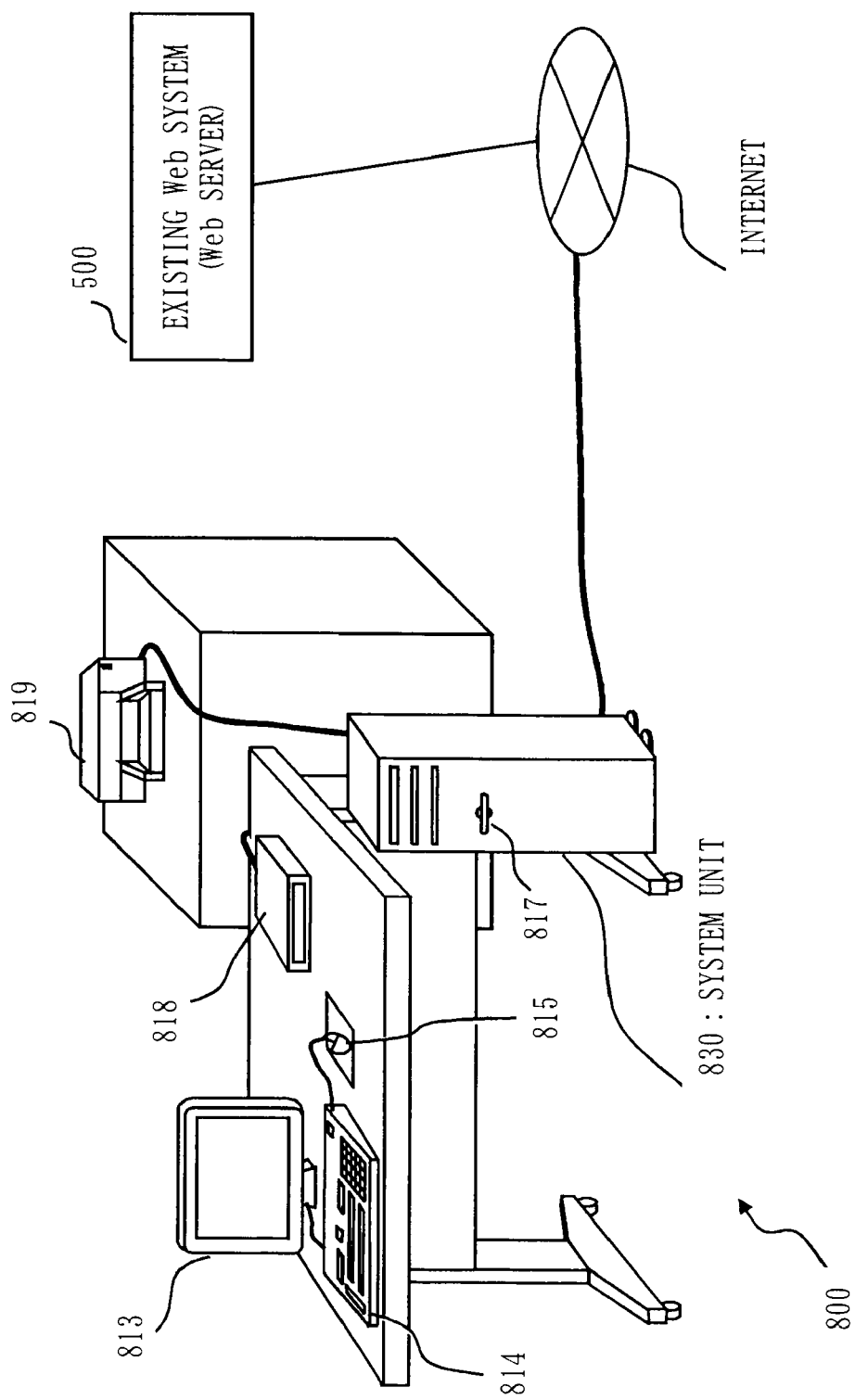
FIG. 1 shows an example of an outer appearance of a server device 800 according to the first embodiment.

FIG. 1 shows an example of an outer appearance of a server device 800 which is implemented by a computer. The server device 800 includes a SOAP (Simple Object Access Protocol: the first protocol) client 100, a SOAP communication function 200, a wrapper 300, and an execution definition 400. Namely, in FIG. 1, the SOAP client 100 through the execution definition 400 are implemented by the server device 800. Here, the SOAP client 100 is sometimes formed as a separate server.

In FIG. 1, the server device 800 includes hardware resources such as a system unit 830, a display device 813 having a display screen of CRT (Cathode Ray Tube) or LCD (Liquid Crystal), a keyboard 814 (Key Board: K/B), a mouse 815, an FDD 817 (Flexible Disk Drive), a CDD 818 (CDD: Compact Disk Drive), a printer device 819, etc., which are connected by cables or signal lines. The server device 800 is able to communicate with an existing Web system 500 through the Internet.

Figure 2:
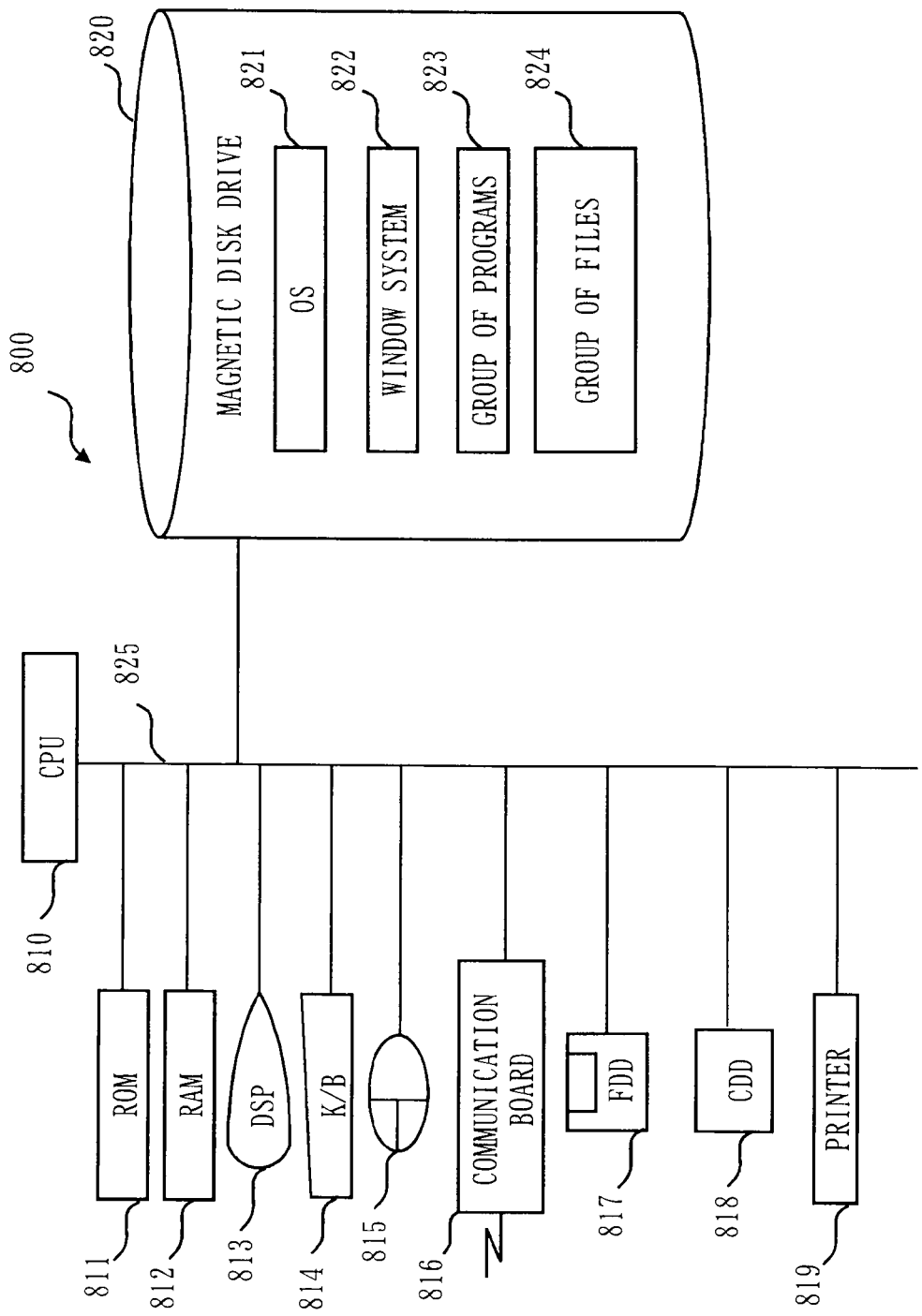
FIG. 2 shows an example of hardware resource of the server device 800 according to the first embodiment.

FIG. 2 shows an example of hardware resource of the server device 800. In FIG. 2, the server device 800 includes a CPU (Central Processing Unit) 810 executing programs. The CPU 810 is connected to a ROM (Read Only Memory) 811, a RAM (Random Access Memory) 812, a display device 813, a keyboard 814, a mouse 815, a communication board 816, an FDD 817, a CDD 818, a printer device 819, and a magnetic disk drive 820 and controls these hardware devices. Instead of the magnetic disk drive 820, a memory device such as an optical disk drive or a flash memory can be also used.

The RAM 812 is an example of a volatile memory Storage medium such as the ROM 811, the FDD 817, the CDD 818, the magnetic disk drive 820, etc. are examples of non-volatile memories. These are examples of a memory device, a memory unit, a storage unit, or a buffer. The communication board 816, the keyboard 814, the FDD 817, etc. are examples of an inputting unit and an inputting device. Further, the communication board 816, the display device 813, the printer device 819, etc. are examples of an outputting unit and an outputting device. The communication board 816 is connected to the Internet and is able to communicate with the existing Web system 500.

The magnetic disk drive 820 stores an operating system (OS) 821, a window system 822, a group of programs 823, and a group of files 824. Programs of the group of programs 823 are executed by the CPU 810, the OS 821, and the window system 822.

The group of programs 823 stores programs executing functions which will be explained in the following embodiments as "-- function", "-- engine", "SOAP client 100", and "execution logic 350". The programs are read and executed by the CPU 810.

The group of files 824 stores information which will be explained in the following embodiments as "execution definition 400", information explained as "determined result of --", "calculated result of --", "extracted result of --", "generated result of --", and "processed result of --", data, signal values, variable values, parameters, etc. are stored as respective items of "-- file" or "-- database". "-- file" and "-- database" are stored in recording medium such as disks or memories. Information, data, signal values, variable values, and parameters stored in the storage medium of disks or memories, etc. are read by the CPU 810 through a reading/writing circuit to a main memory or a cache memory, and used for the operation of the CPU such as extraction, search, reference, comparison, operation, calculation, process, output, printing, display, etc. During the operation of the CPU of extraction, search, reference, comparison, operation, calculation, process, output, printing, and display, information, data, signal values, variable values, and parameters are temporarily stored in the main memory, the cache memory, or the buffer memory.

Further, in the explanation of the following embodiments, data or signal values are stored in the recording medium such as a memory of the RAM 812, a flexible disk of the FDD 817, a compact disc of the CDD 818, a magnetic disk of the magnetic disk drive 820, and other optical disk, a mini-disk, DVD (Digital Versatile Disk), etc. Further, data or signals are transmitted on-line by transmission medium such as a bus 825, signal lines, cables, and so on.

Further, "-- function", "-- engine", "SOAP client 100", and "execution logic 350" explained in the explanation of the following embodiments can be "-- means", "-- circuit", and "-- equipment", and can be also "-- step", "-- procedure", and "-- process". Namely, elements explained as "-- function", "-- engine", etc. can be implemented by firmware stored in the ROM 811. Or it can be implemented also by only software, by only hardware such as elements, devices, boards, wirings, etc., or by a combination of software and hardware, and a combination further with firmware. Firmware and software are stored as programs in the recording medium such as a magnetic disk, a flexible disk, an optical disk, a compact disk, a mini-disk, DVD, etc. Programs are read by the CPU 810 and executed by the CPU 810. Namely, programs are to function a computer as "-- function", "-- engine", etc. which will be discussed below. Or, programs are to have a computer execute procedures or methods such as "-- function", "-- engine", etc. which will be discussed below.

Figure 3:
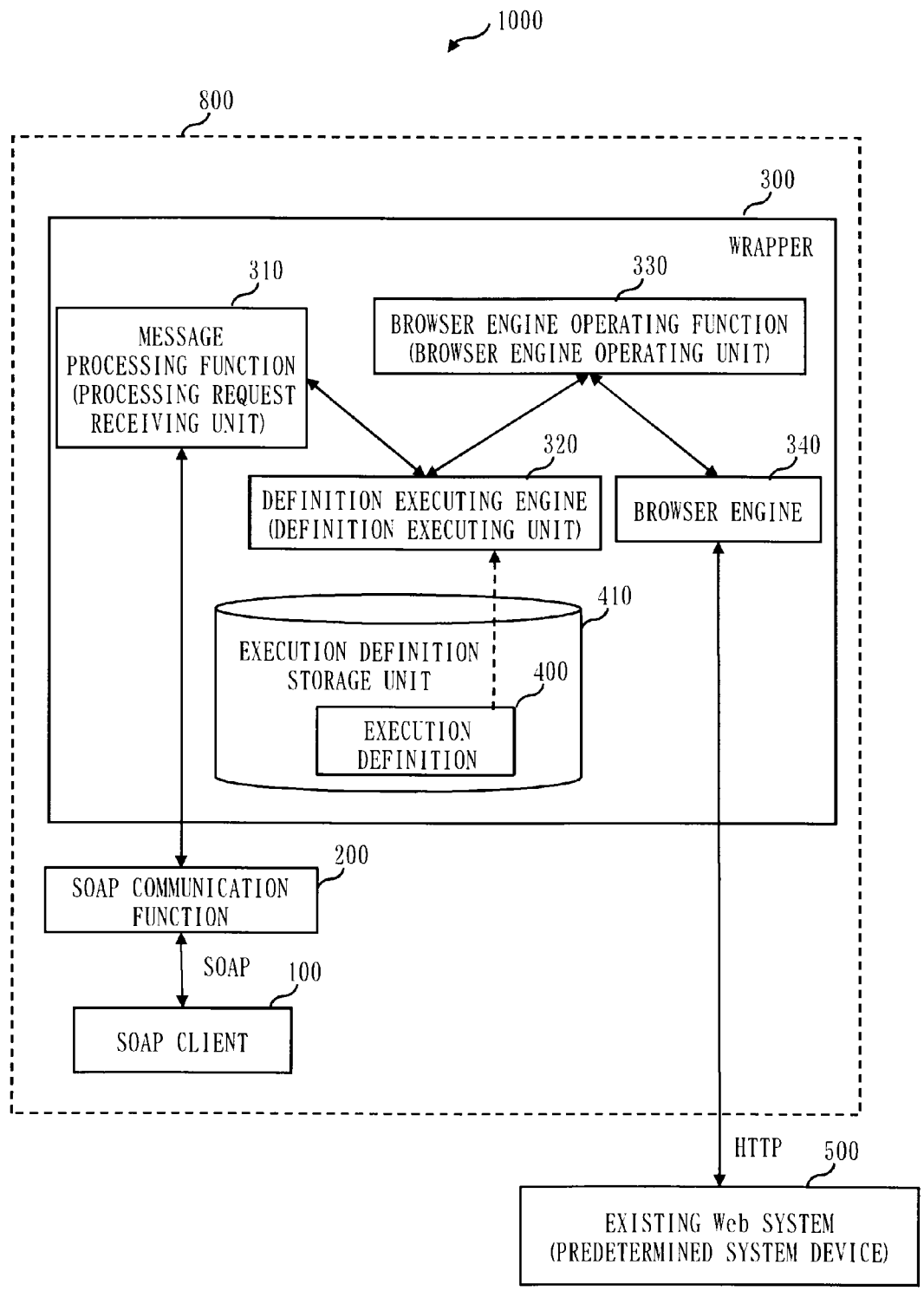
FIG. 3 is a configuration diagram of a Web wrapping system 1000 according to the first embodiment.

FIG. 3 is a configuration diagram of a Web wrapping system 1000 according to the first embodiment. The Web wrapping system 1000 is configured by a SOAP client 100, a SOAP communication function 200, a wrapper 300 (a user operation acting device), and an existing Web system 500.

(1) The SOAP client 100 is a program to send a processing request to a wrapped Web service.
(2) The SOAP communication function 200 sends/receives SOAP messages and issues a processing request to a message processing function 310.
(3) The wrapper 300 is a device to wrap the existing Web system 500.
(4) The existing Web system 500 is a system which is a target for wrapping.

The wrapper 300 includes a message processing function 310 (processing request receiving unit), a definition executing engine 320 (definition executing unit), a browser engine operating function 330 (browser engine operating unit), a browser engine 340 and an execution definition storing unit 410 storing execution definition 400. The execution definition 400 stored in the execution definition storing unit 410 is data which describes operation and process which are desired to be wrapped.

In the wrapper 300,
(1) the message processing function 310 analyzes SOAP body and issues a processing request to the definition executing engine 320;
(2) the definition executing engine 320 reads and executes the execution definition 400 corresponding to the processing request;
(3) the browser engine operating function 330 performs a click operation, data input, extraction operation, etc. by the browser engine, and copies the browser engine; and
(4) the browser engine 340 accesses the existing Web system 500 to conduct HTTP (HyperText Transfer Protocol: the second protocol) communication.

Figure 4:
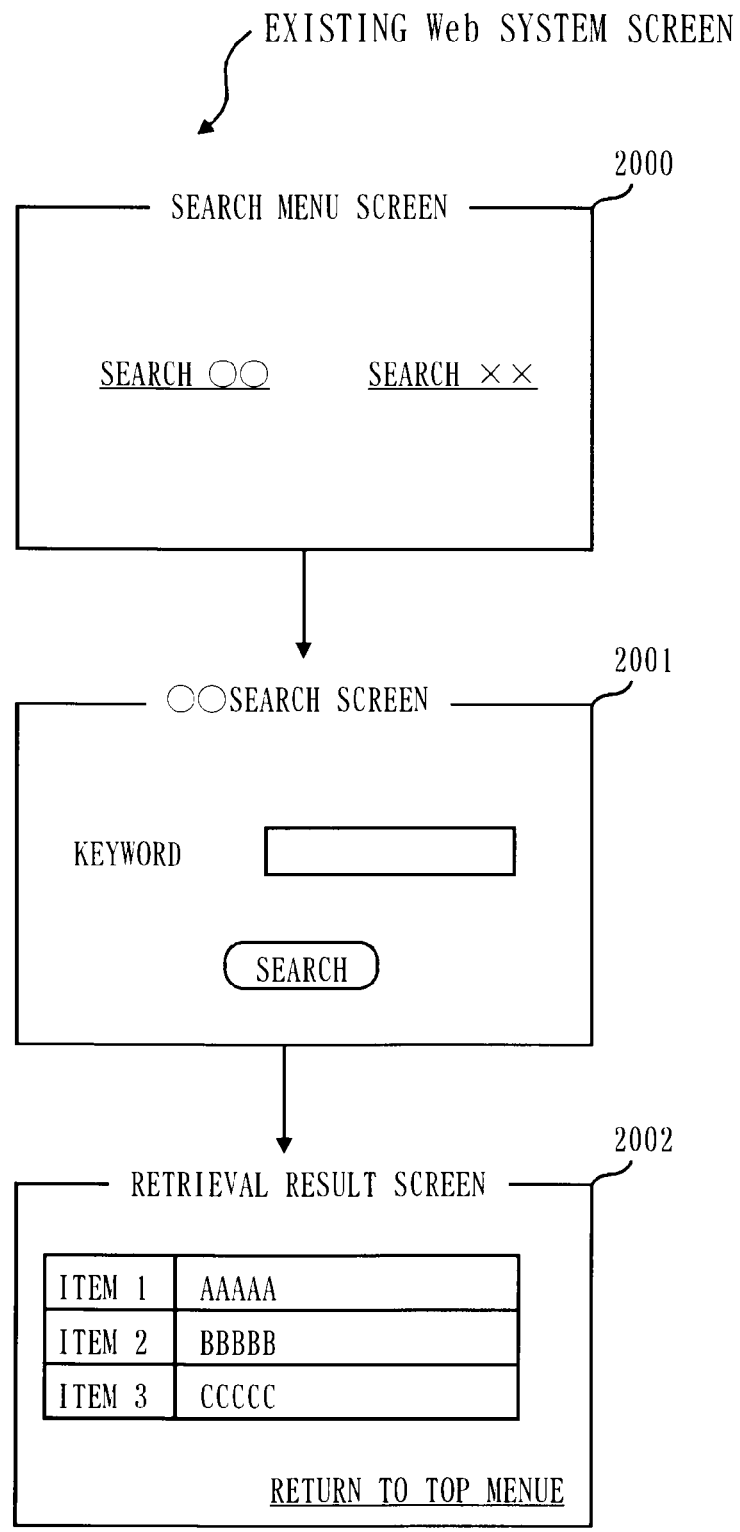
FIG. 4 shows a flow of user operation for the existing Web system 500 according to the first embodiment.

FIG. 4 shows a flow of user operation for the existing Web system 500 which is a target of wrapping according to the first embodiment. In FIG. 4, when the user accesses "search menu screen 2000" and clicks "search oo", "search menu screen 2000" moves to "oo search screen 2001". In "oo search screen 2001", when the user inputs "keyword" and clicks "search" button, "oo search screen 2001" moves to "retrieval result screen 2002". In "retrieval result screen 2002", items 1 through 3 are displayed as the retrieval result. It is assumed that the user wants to obtain values "BBBBB" in the second line, the second column in the table by these user operations.
(Execution Definition 400)

Figures 5, 6:
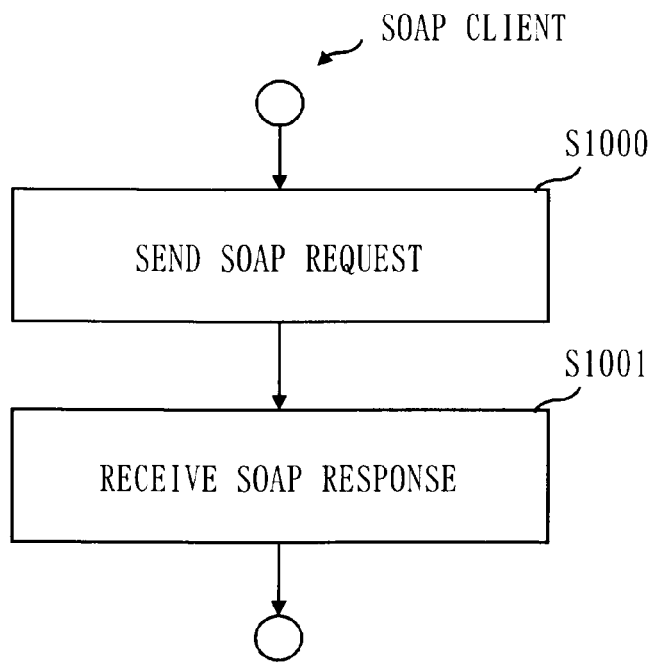
FIG. 5 shows an execution definition 400 which defines the user operation in the flow of user operation of FIG. 4.
FIG. 6 is a flowchart of a SOAP client 100 according to the first embodiment.

FIG. 5 shows contents of the execution definition 400 which defines the user operation in the above flow of the user operation. "Operation (keyword)" is operation definition of the Web service operation. The operation name is "operation", a parameter is "keyword", and "keyword" is a keyword for search.
(SOAP Client 100, SOAP Communication Function 200)

Figure 7:
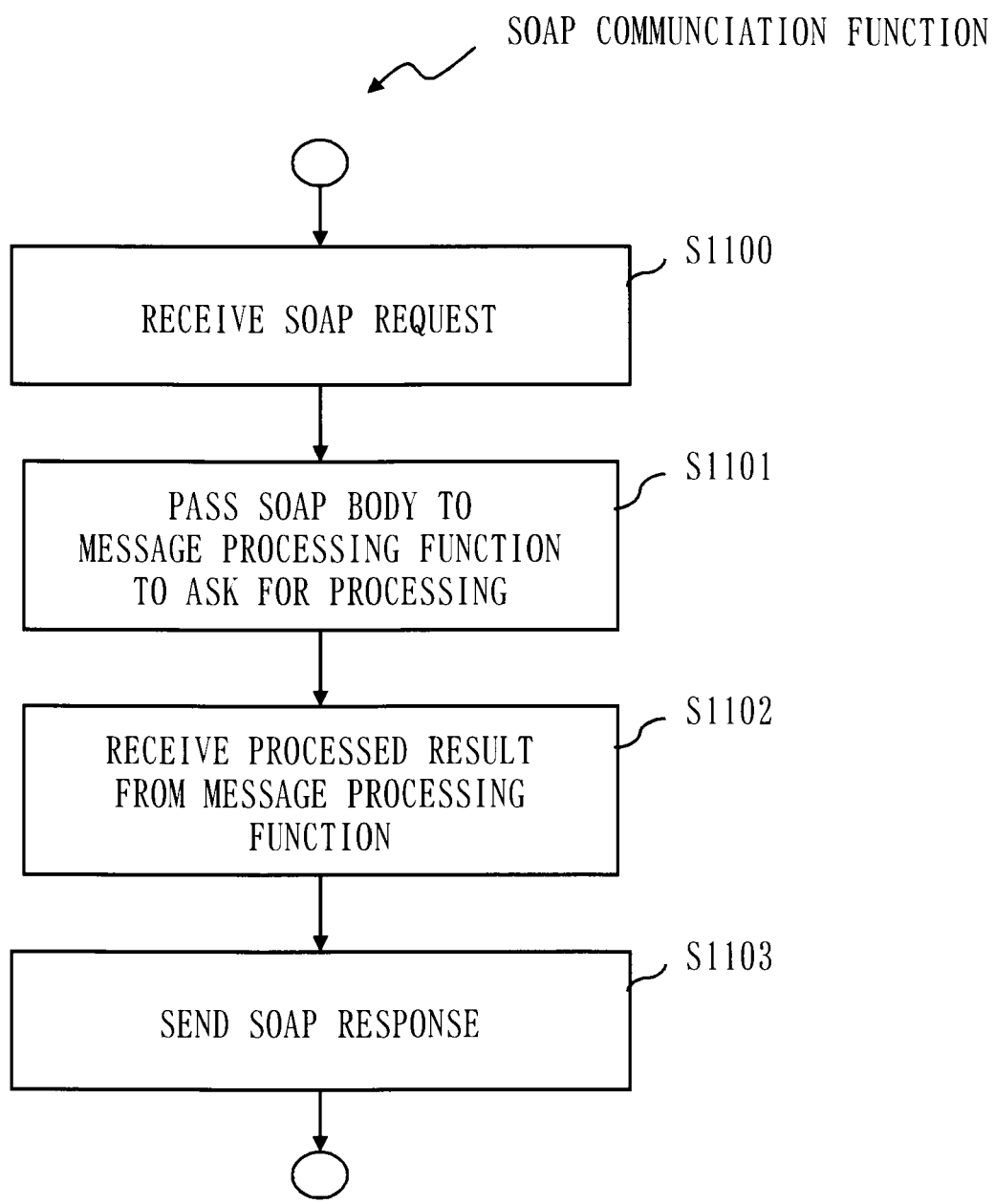
FIG. 7 is a flowchart of a SOAP communication function 200 according to the first embodiment.
Figure 13:
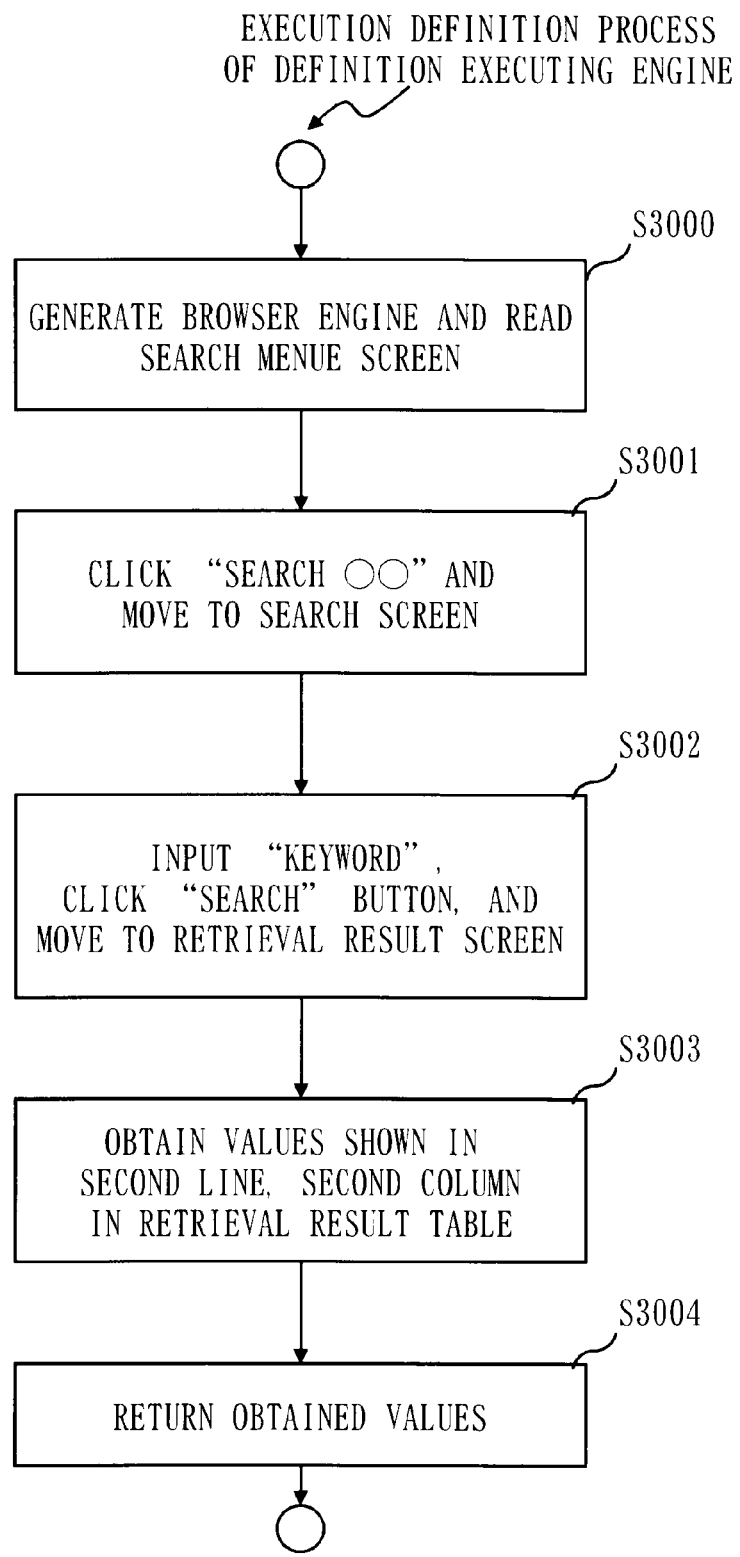
FIG. 13 is a flowchart of execution definition process of the definition executing engine 320 according to the first embodiment.
Figure 14:
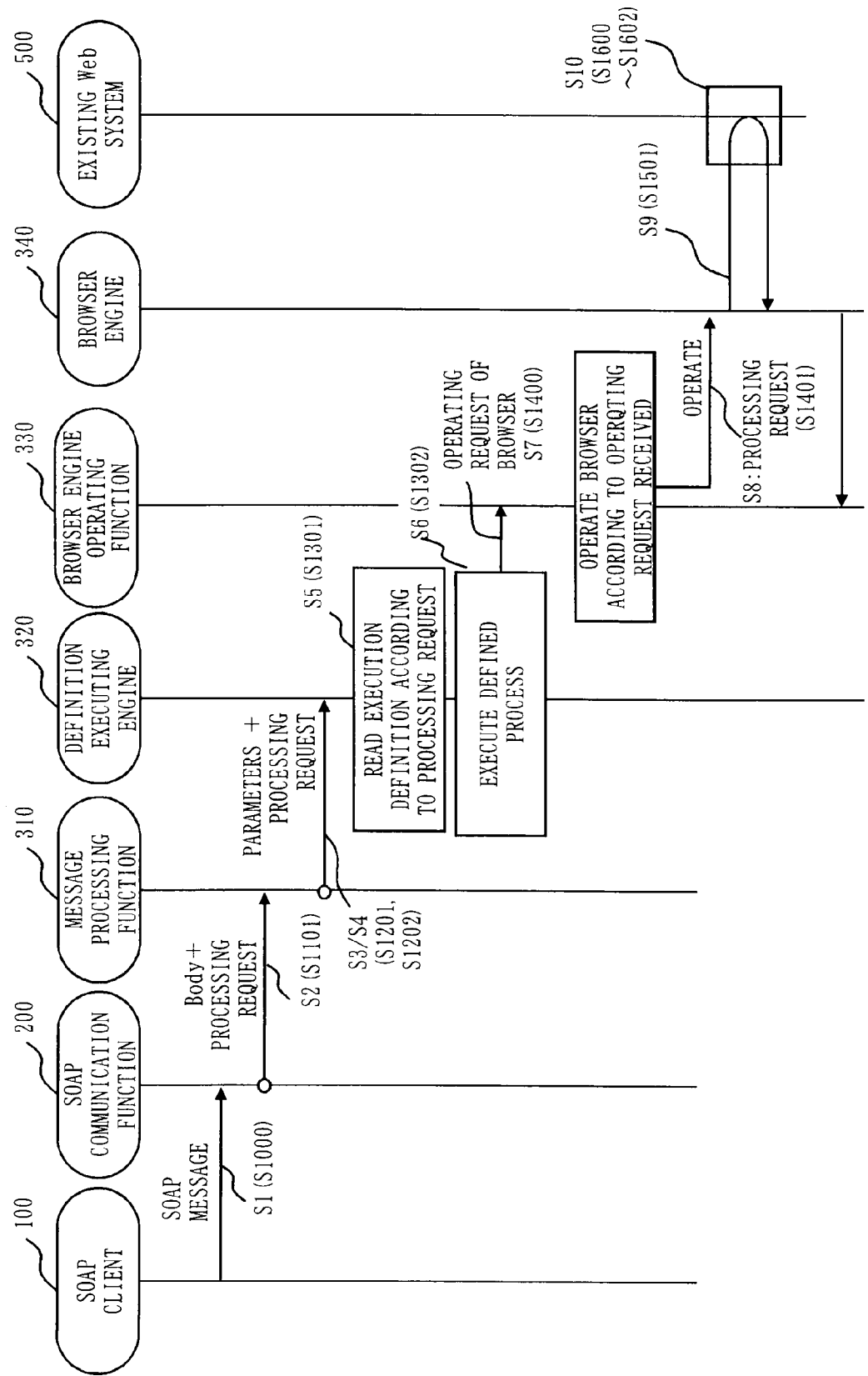
FIG. 14 is a sequence showing an operation of a wrapper 300 according to the first embodiment.

Next, the operation will be explained with reference to flowcharts of FIGS. 6 through 13 and a sequence diagram of FIG. 14 showing general operation. FIG. 14 shows the operation of each flowchart as a sequence (steps S1 through S10). First, explanation will be done with reference to FIGS. 6, 7, and 14. FIG. 6 is a flowchart of the operation of a SOAP client 100. Further, FIG. 7 is a flowchart of the operation of a SOAP communication function 200. First, as shown in FIG. 6, the SOAP client 100 sends a SOAP message (SOAP request) to a wrapped service (the SOAP communication function 200) (S1000, S1), and receives a response from the SOAP communication function 200 (S1001). Further, as shown in FIG. 7, the SOAP communication function 200 receives the SOAP message from the SOAP client 100 (S1100). Then, the SOAP communication function 200 extracts a SOAP body from the received SOAP message, and passes a processing request together with the SOAP body to a message processing function 310 (S1101, S2). The SOAP communication function 200 receives a processed result from the message processing function 310 (S1102), and returns the processed result (SOAP response) to the SOAP client 100 (S1103).
(Message Processing Function 310)

Figure 8:
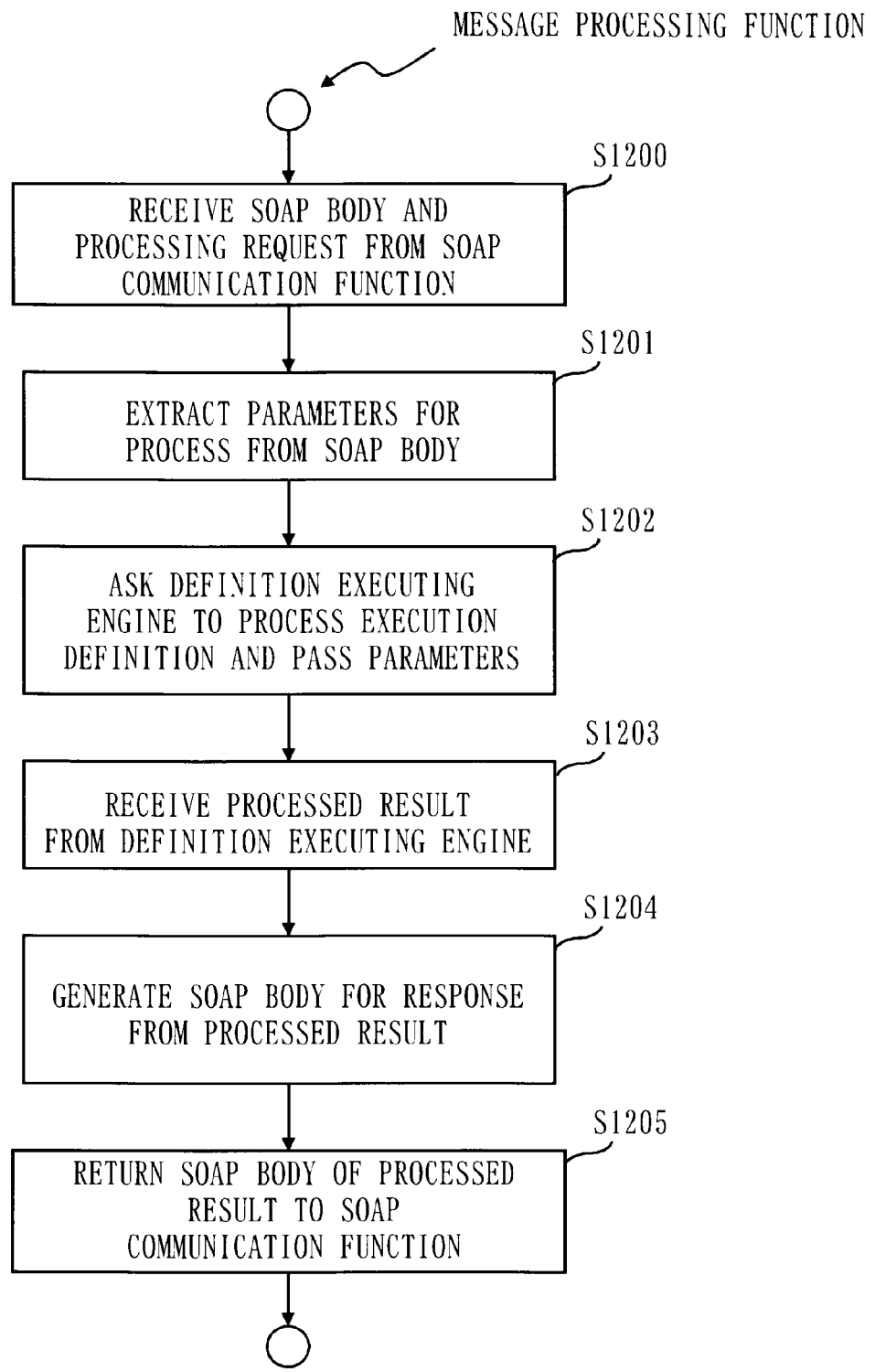
FIG. 8 is a flowchart of a message processing function 310 according to the first embodiment.

FIG. 8 is a flowchart showing the operation of the message processing function 310. The message processing function 310 extracts a value which is to be a parameter for Web service operation (S1201, S3) from the SOAP body received from the SOAP communication function 200 (S1200), and passes the extracted parameter together with the processing request to a definition executing engine 320 (S1202, S4). The message processing function 310 receives the processed result from the definition executing engine 320 (S1203), stores the processed result received from the definition executing engine 320 in the SOAP body (S1204), and returns the SOAP body to the SOAP communication function 200 (S1205).
(Definition Executing Engine 320)

Figure 9:
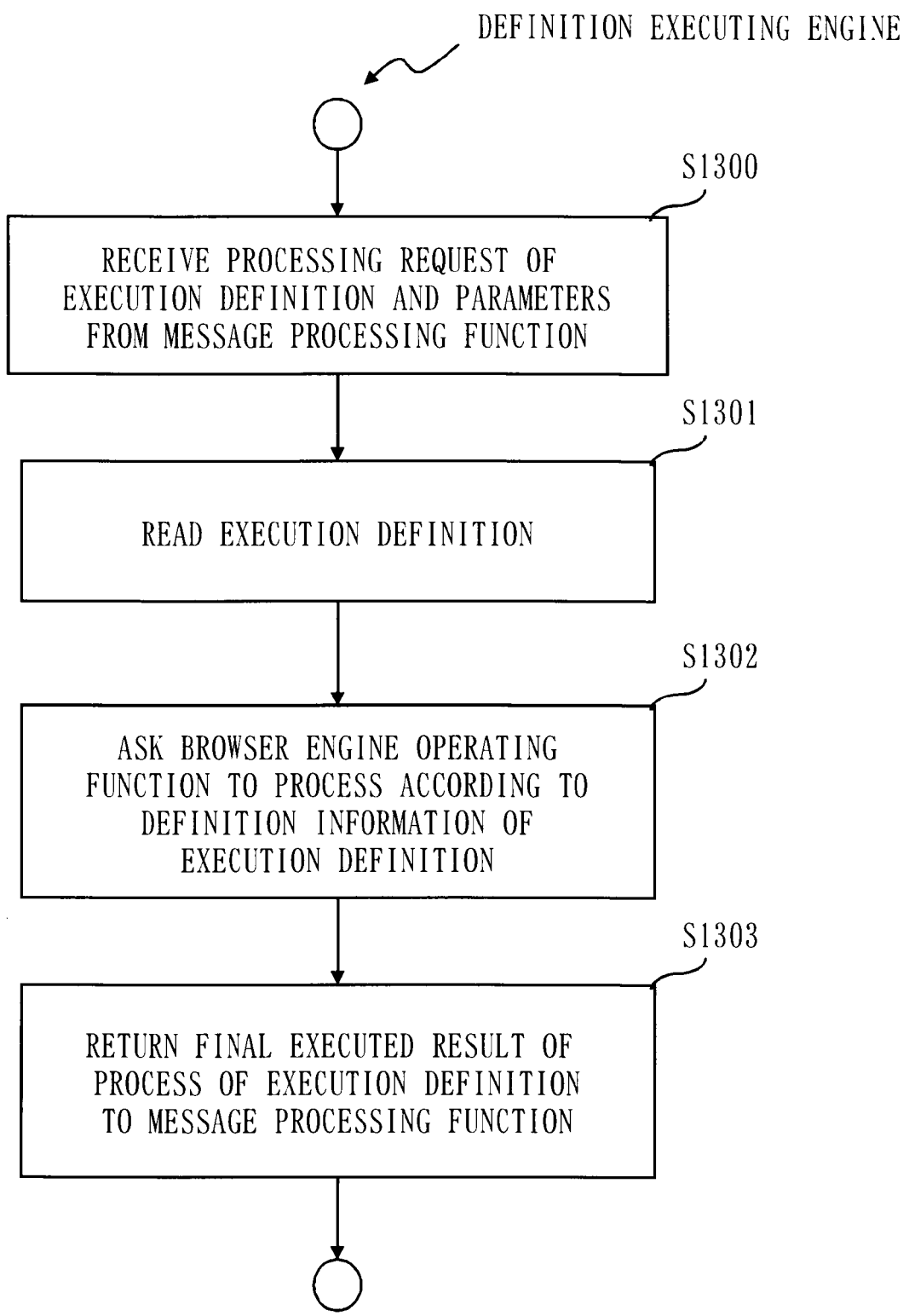
FIG. 9 is a flowchart of a definition executing engine 320 according to the first embodiment.

FIG. 9 is a flowchart showing the operation of the definition executing engine 320. As shown in FIG. 9, the definition executing engine 320 reads the execution definition 400 corresponding to the processing request received from the message processing function 310 (S1300) from the execution definition storing unit 410 (S1301, S5), and executes the process defined by the execution definition 400 (S1302, S6). Namely, at S1302, the definition executing engine 320 outputs a processing request (a browser operation instructing signal) to the browser engine operation function 330 according to the definition information of the execution definition 400. The definition executing engine 320 returns the final processed result of the process of the execution definition 400 to the message processing function 310 (S1303).
(Browser Engine Operating Function 330)

FIG. 10 is a flowchart showing the operation of a browser engine operating function 330. As shown in FIG. 10, the browser engine operating function 330 receives an operating request of the browser engine (browser operation instructing signal) from the definition executing engine 320 (S1400, S7), executes the browser engine operation according to the operating request (S1401, S8), and returns the processed result of the browser engine operation to the definition executing engine 320 (S1402).
(Browser Engine 340)

FIG. 11 is a flowchart showing the operation of a browser engine 340. As shown in FIG. 11, the browser engine 340 receives a processing request from the browser engine operating function 330 (S1500), conducts HTTP communication with an existing Web system 500 (S1501, S9) according to the processing request, and returns the processed result (communication result) to the browser engine operating function 330 (S1502).
(Existing Web System 500)

Figure 12:
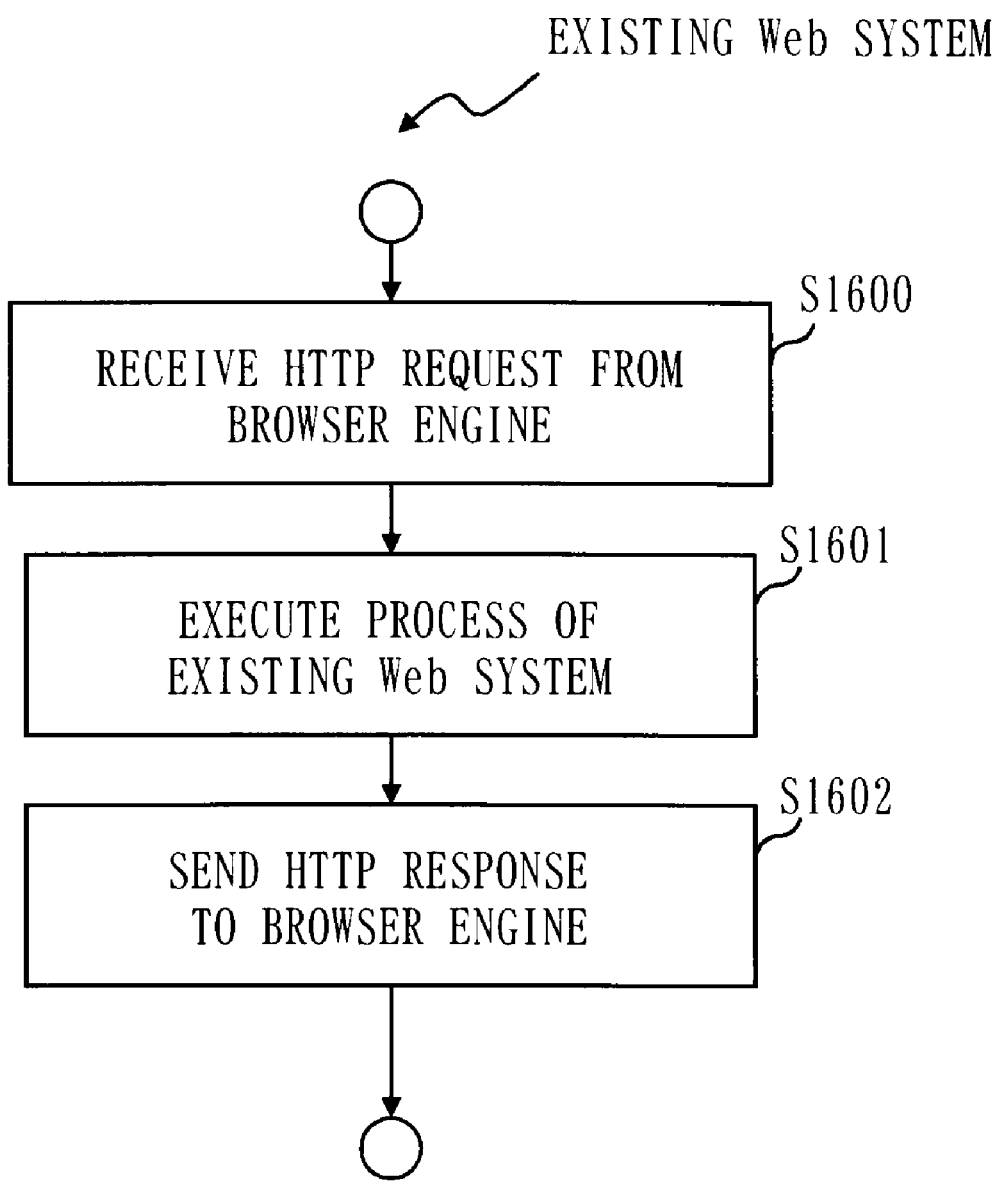
FIG. 12 is a flowchart of an existing Web system 500 according to the first embodiment.

FIG. 12 is a flowchart showing the operation of the existing Web system 500. As shown in FIG. 12, the existing Web system 500 carries out conventional process (S1600 through S1602, S10). Namely, at S1600, the existing Web system 500 receives a HTTP request from the browser engine 340. At S1601, the process of the existing Web system 500 is executed. At S1602, the existing Web system 500 sends a HTTP response to the browser engine 340.
(Definition Executing Engine 320)

FIG. 13 is a flowchart showing a flow of a process, which is processed by reading and executing the execution definition 400 shown in FIG. 5 by the definition executing engine 320. This process reproduces a flow of the user operation which has been explained in FIG. 4. As discussed above, by operating the browser engine 340 with the browser engine operating function 330 according to the operating request (the browser operation instructing signal) received from the definition executing engine 320, the process of FIG. 13 is executed. Namely, although the following explanation describes the definition executing engine 320 as an operating subject in FIG. 13, exactly, as will be discussed in the following (1) through (5), the definition executing engine 320 issues the operating request to the browser engine operating function 330, and the browser engine operating function 330 which receives the operating request operates the browser engine, and the operation is executed. Namely, the definition executing engine 320 executes the operation through the browser engine operating function 330 and the browser engine.
(1) At S3000, the browser engine operating function 330 generates the browser engine 340. The generated browser engine 340 reads "search menu screen 2000" from the existing Web system 500.
(2) At S3001, by clicking "search oo" with the browser engine 340, "search menu screen 2000" moves to "oo search screen 2001".
(3) At step S3002, by inputting "keyword" and clicking the "search" button with the browser engine 340, "oo search screen 2001" moves to "retrieval result screen 2002".
(4) At step S3003, the browser engine 340 obtains the values "BBBBB" expressed in the second line, the second column in the table of retrieval result.
(5) At step S3004, the browser engine 340 returns the obtained values "BBBBB".

As discussed above, the browser engine 340 acting as the user operation and its operating function are processed by the execution of the execution definition 400, so that it is possible to wrap and serve a flow of the screen operation or the screen transition. Further, since the execution definition 400 is an operation definition which is close to the operation level in case of handling the existing Web system 500 by the user, which minimizes research of the existing Web system 500, so that it is possible to reduce the number of steps required for constructing a new system.

The present invention enables the wrapping system which speeds up the operation using plural programs to reduce research contents for the existing Web system.

Embodiment 2

Next, the second embodiment will be explained with reference to FIGS. 15 through 20. In the above first embodiment, it has been explained a case in which a flow of the screens of the existing Web system 500 operated by the user is single and simple. On the contrary, the second embodiment will show a wrapping of the user operation including respective flows which are separated flow of the screen.
(System Configuration)

Figure 15:
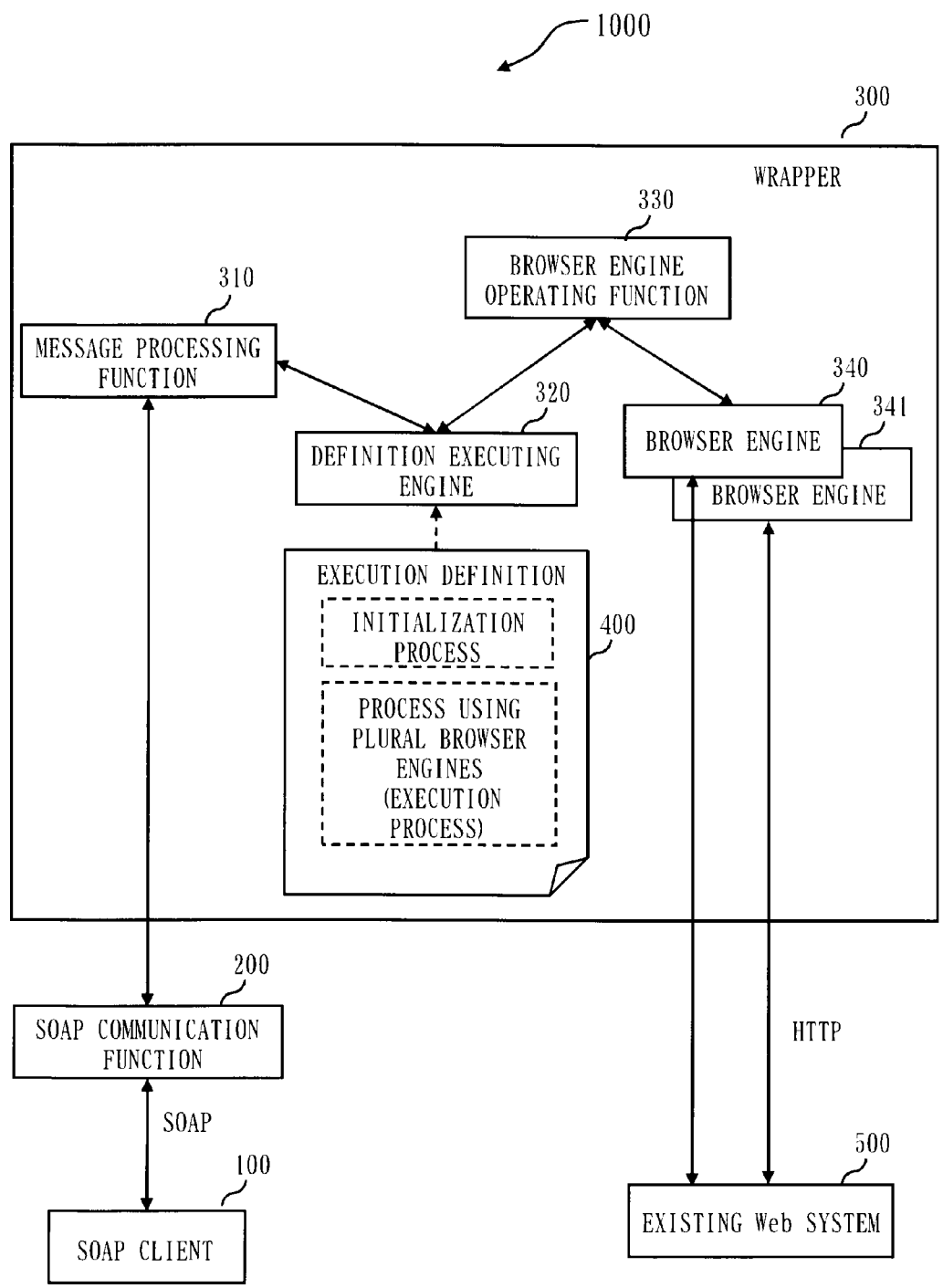
FIG. 15 is a configuration diagram of a Web wrapping system 1000 according to the second embodiment.

First, the system configuration will be explained. FIG. 15 is a configuration diagram of a Web wrapping system 1000 according to the second embodiment. In FIG. 15, the system configuration is the same as the first embodiment shown in FIG. 3 except for the contents of the execution definition 400 and the addition of a browser engine 341.
(1) In the execution definition 400 of FIG. 15, "initialization process" and "process using plural browser engines" (execution process) are described.
(2) The browser engine 341 has an equivalent function to the browser engine 340.
The browser engine 341 accesses the existing Web system 500 to conduct HTTP communication.
(Screen of Existing Web System 500)

Figure 16:
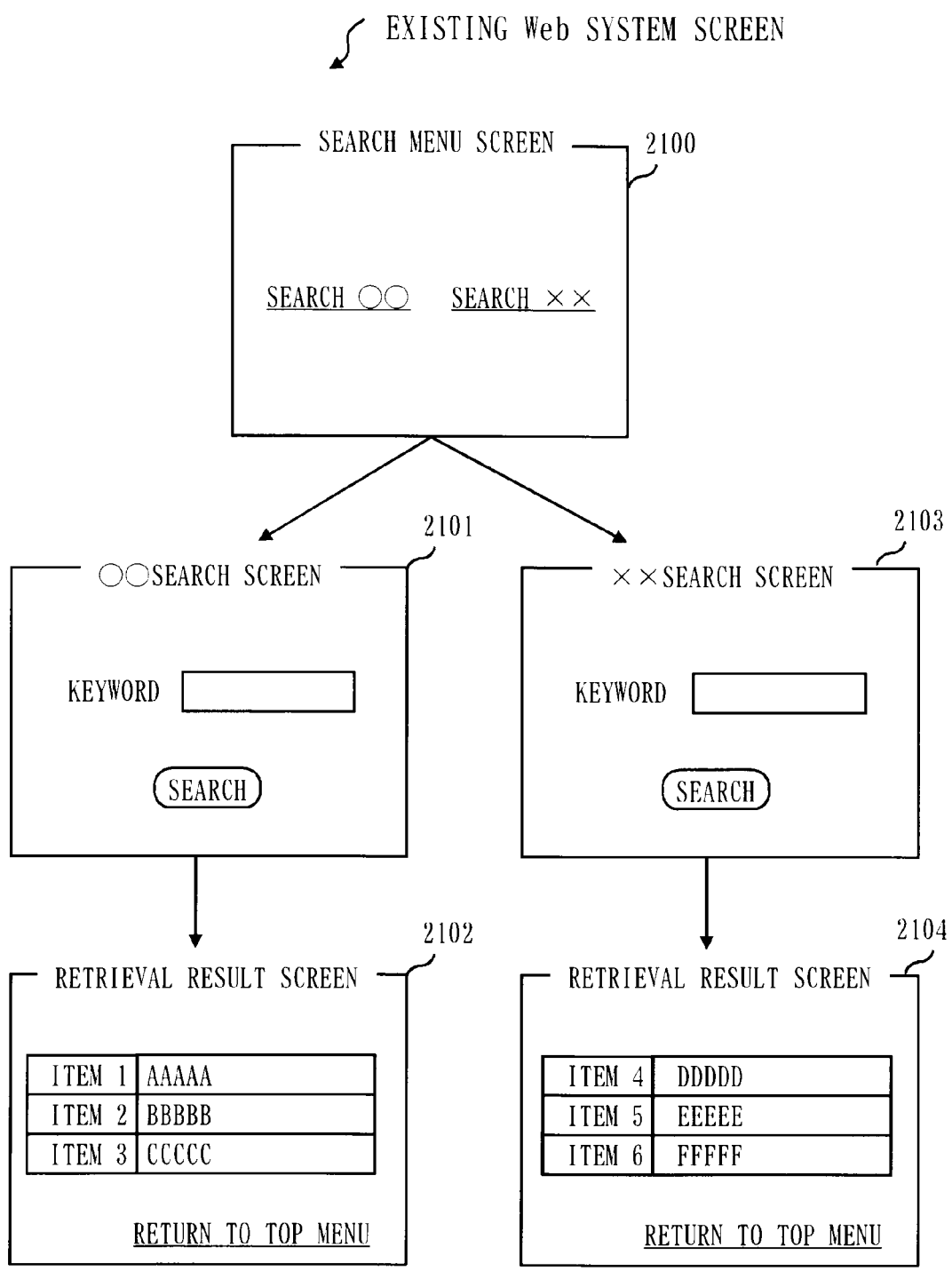
FIG. 16 shows a flow of user operation for an existing Web system 500 according to the second embodiment.

FIG. 16 shows a flow of the user operation of the existing Web system 500 which is a target for wrapping in the second embodiment. In FIG. 16,
(1) when the user accesses "search menu screen 2100" and clicks "search oo", the screen moves to "oo search screen 2101",
(2) when the user inputs "keyword" and clicks "search" button, the screen moves to "a retrieval result screen 2102",
(3) then the user can obtain values (BBBBB) of the second line, the second column in the table.
(4) Further, the user again accesses "search menu screen 2100" and clicks "search xx", the screen moves to "xx search screen 2103",
(5) when the user inputs "keyword" and clicks "search" button, the screen moves to "retrieval result screen 2104", and
(6) it is assumed that the user wants to obtain values (EEEEE) of the second line, the second column in the table and that the user wants to obtain two kinds of retrieval results "BBBBB" and "EEEEE".
(Execution Definition 400)

FIG. 17 is the execution definition 400 according to the second embodiment which defines the user operation (execution process) and the initialization process in the flow of the user operation shown in FIG. 16. In the execution definition 400, the initialization process is described in "init( )", and the user operation (execution process) is described in "operation2 (keyword, separator)" which is the operation definition for the Web service operation. The operation name is "operation2" and the parameters are "keyword" and "separator". "keyword" becomes a keyword for the search. Further, "separator" becomes a separator character for connecting two retrieval result character strings. The initialization process describes the process to move plural browser engines to status in which the number of screen transitions by the user operation is minimized. Further, the definition of the user operation describes the operation using the browser engine which optimized in the initialization process.

Next, the operation will be explained. The operation is the same as the first embodiment except for the operation of the definition executing engine 320.
(Operational Flow of Definition Executing Engine 320)

Figure 18:
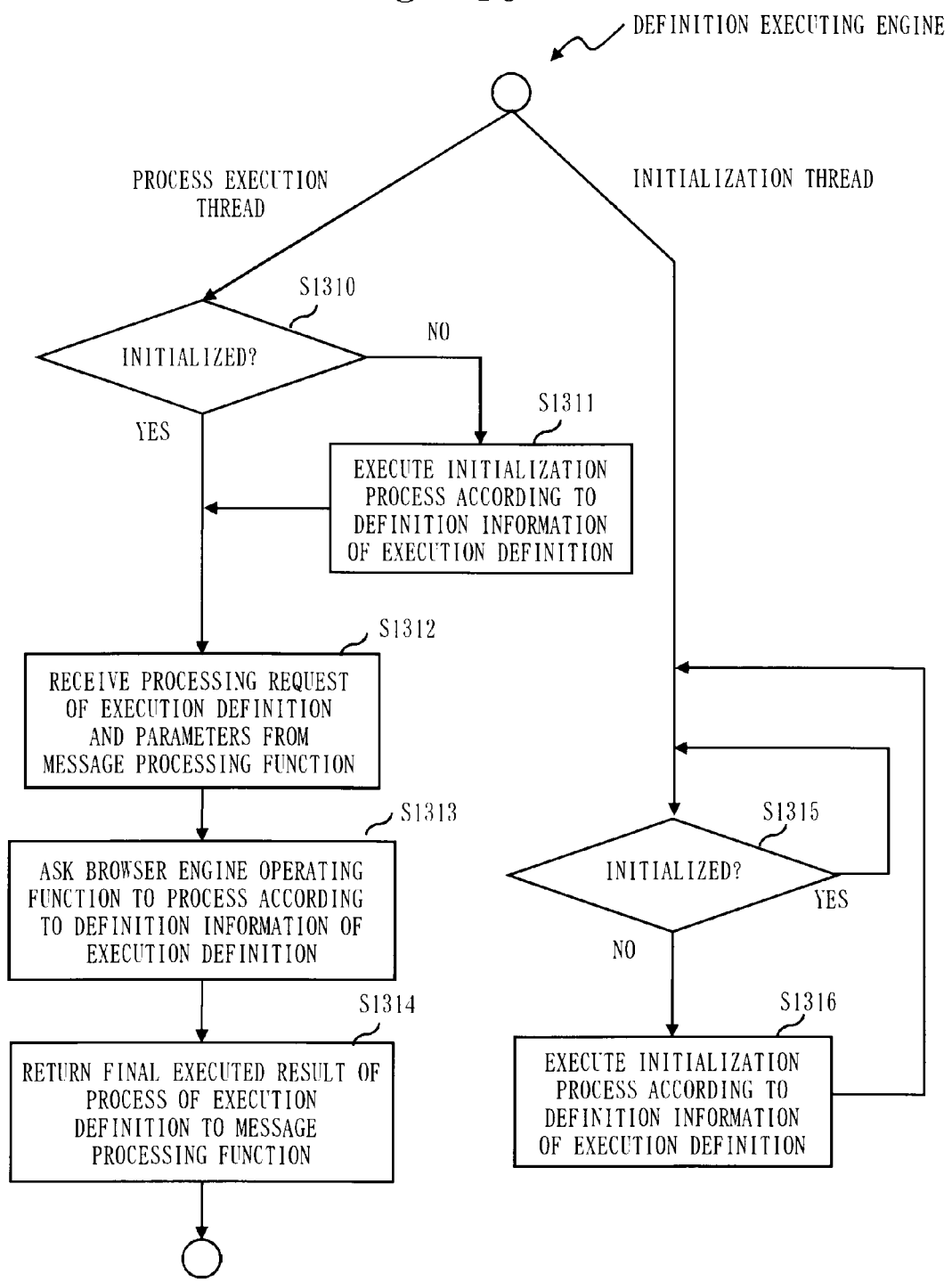
FIG. 18 is a flowchart of a definition executing engine 320 according to the second embodiment.

FIG. 18 is a flowchart showing the operation of the definition executing engine 320. The explanation will be done with reference to FIG. 18. In the definition executing engine 320, an initialization thread for service operates from the time of starting the wrapping system. Further, when the processing request is received from the message processing function 310, the process execution thread operates.

In the initialization thread, the definition executing engine 320 observes the initialization status of the service (S1315). If not initialized, the definition executing engine 320 executes the initialization process described in the execution definition 400 (S1316).
(Contents of Initialization Process by Definition Executing Engine 320)

Figure 19:
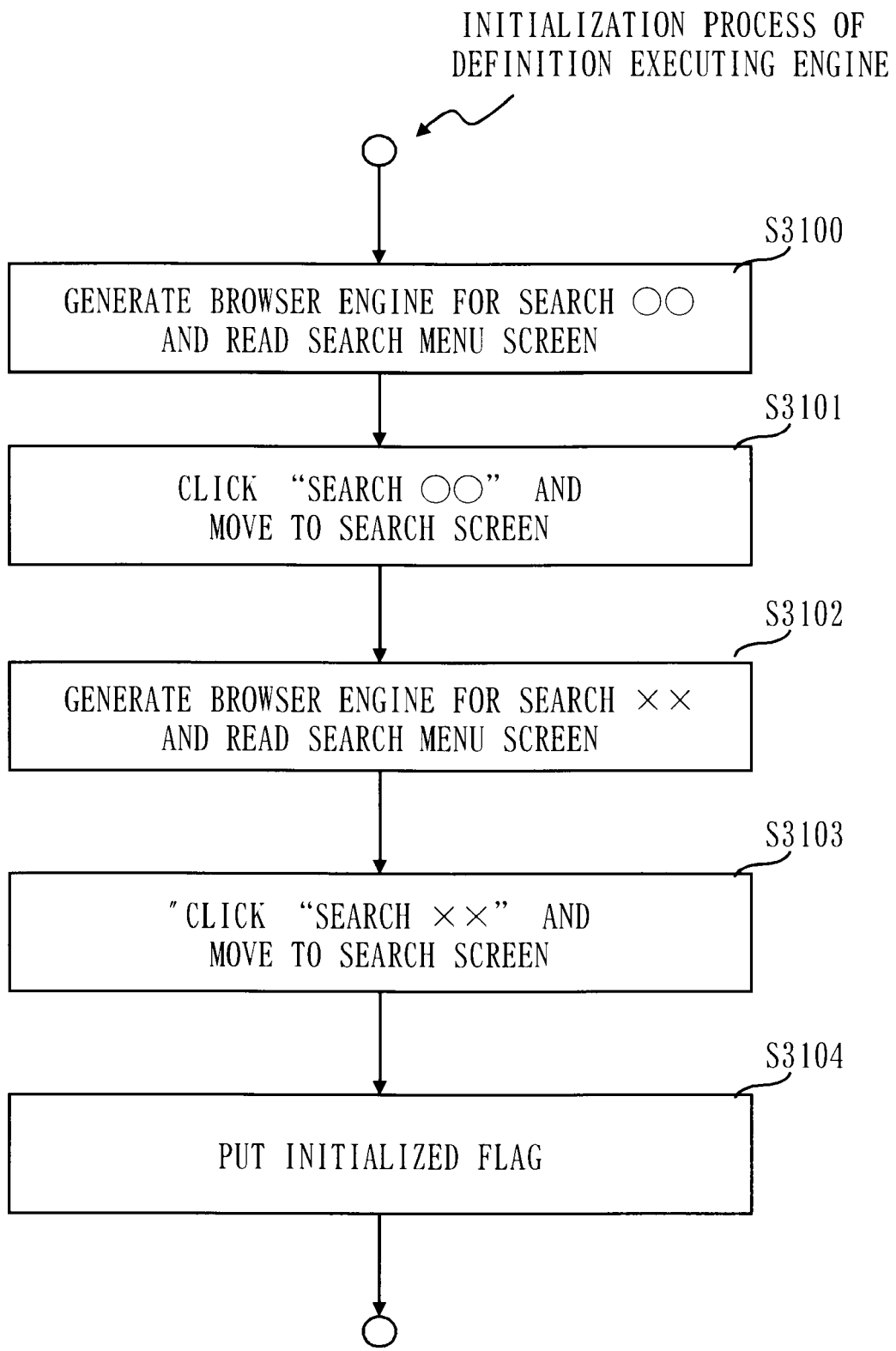
FIG. 19 is a flowchart of initialization process of the definition executing engine 320 according to the second embodiment.

FIG. 19 is a flowchart showing the contents of the initialization process by the definition executing engine 320. In the initialization process, the definition executing engine 320 reads the definition of the initialization process from the execution definition storing unit 410 at a prescribed timing (at the time of threading to the initialization, or at the time of determining at S1310 in the processing thread (No at S1310) in FIG. 18). Then, the definition executing engine 320 generates an operating request (a browser initialization processing signal) for instructing the browser engine operating function 330 to operate the browser engine corresponding to the initialization based on the read definition of the initialization process, and outputs the generated operating request to the browser engine operating function 330. On receiving the operating request, the browser engine operating function 330 executes the process according to the operating request. In the initialization process, the browser engine operating function 330 generates a status in which the browser engine 340 is moved to "oo search screen 2101" (S3100, S3101) and a status in which the browser engine 341 is moved to "xx search screen 2103" (S3102, S3103), and puts the initialized flag (S3104).
(Process Execution Thread)

In the process execution thread, the operation is the same as the definition executing engine 320 of FIG. 9 in the first embodiment except for the initialization check of the service (S1310-1311 in FIG. 18). In the process execution thread, the definition executing engine 320 reads the definition of execution process from the execution definition storing unit 410, and generates an operating request (a browser execution processing signal) instructing the browser engine operating function 330 to operate the browser engine corresponding to the execution process based on the definition of the execution process read, and outputs the generated operating request (a browser execution processing signal) to the browser engine operating function 330 after outputting the operating request of the initialization process. When the operating request (the browser execution processing signal) is inputted, the browser engine operating function 330 operates each of the browser engines according to the operating request (the browser execution processing signal).
(Execution Process by Definition Executing Engine 320)

Figure 20:
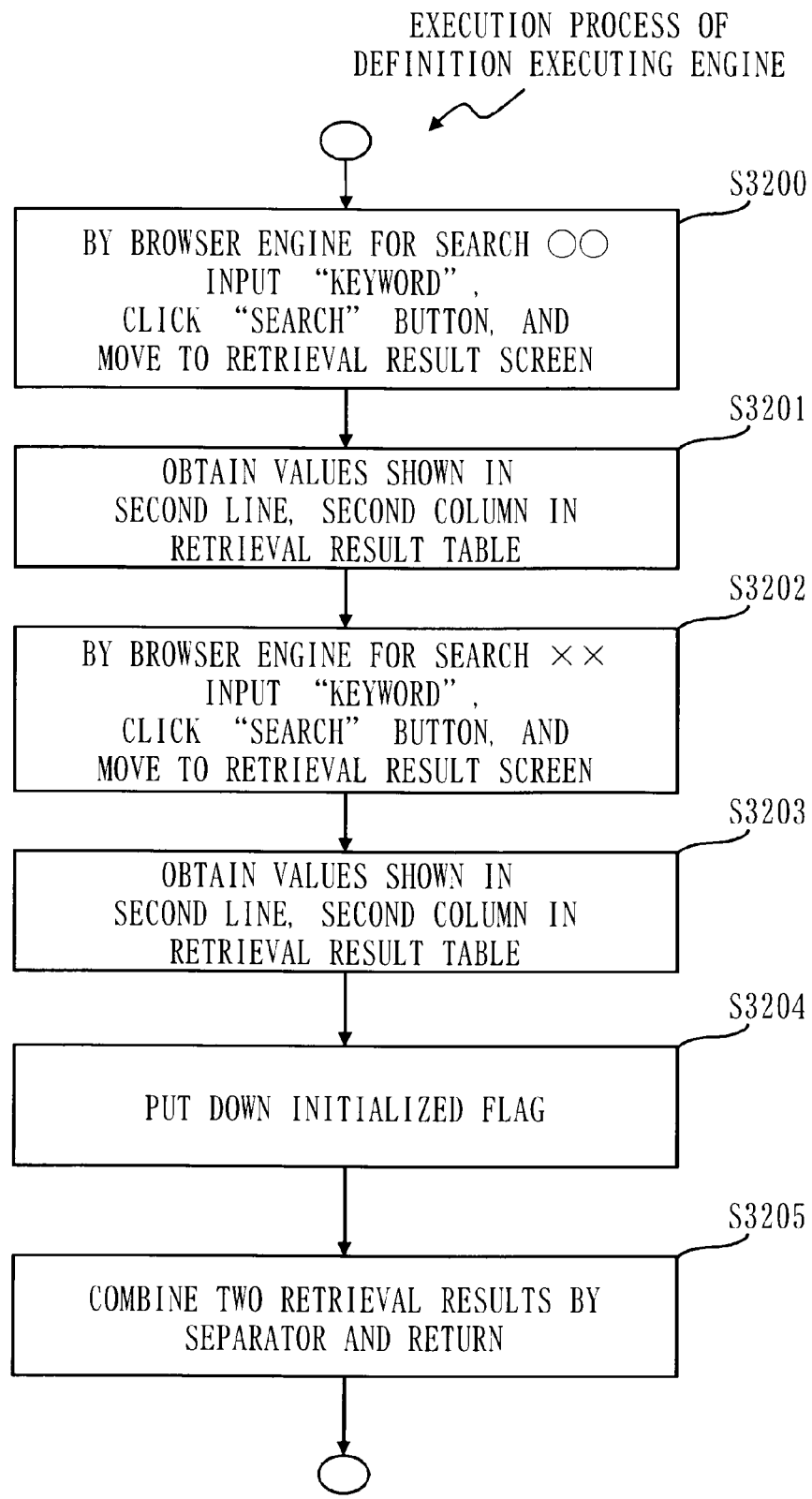
FIG. 20 is a flowchart of execution definition process of the definition executing engine 320 according to the second embodiment.

FIG. 20 is a flowchart showing a flow processed by executing a part in which "operation (process) using plural browser engines" (execution process) of the execution definition 400 is described when the definition executing engine 320 receives the processing request from the message processing function 310. First, the definition executing engine 320 carries out search using the browser engine 340 which has been moved to "oo search screen" in "initialization process" (S3200) and maintains the retrieval result (S3201). Next, the definition executing engine 320 carries out search using the browser engine 341 which has been moved to "xx search screen" in the initialization process (S3202), and maintains the retrieval result (S3203). Then, the definition executing engine 320 puts down the initialized flag (S3204), combines the two retrieval result by a separator and returns it (S3205). This operation reproduces the flow of the above user operation.

As discussed above, by defining "process using plural browser engines" (execution process) and "initialization process for each browser engine", it is possible to wrap and serve the user operation including flows which are separated from the screen of the existing Web system 500. Further, in the initialization process, each browser engine can be moved to the optimal status beforehand, so that it is possible to eliminate unnecessary screen transition at the time of processing request as a service and speed-up the process. Here, even if a flow of screens is single and in the midstream there exists a screen for which reading is late, it is also possible to speed-up the process by the initialization.

Embodiment 3

Next, with reference to FIGS. 21 through 28, the third embodiment will be explained. In the above first and second embodiments, user authentication is unnecessary for using the existing Web system 500; however, the third embodiment will explain a case in which the user authentication is necessary for using the existing Web system 500.

Figure 21:
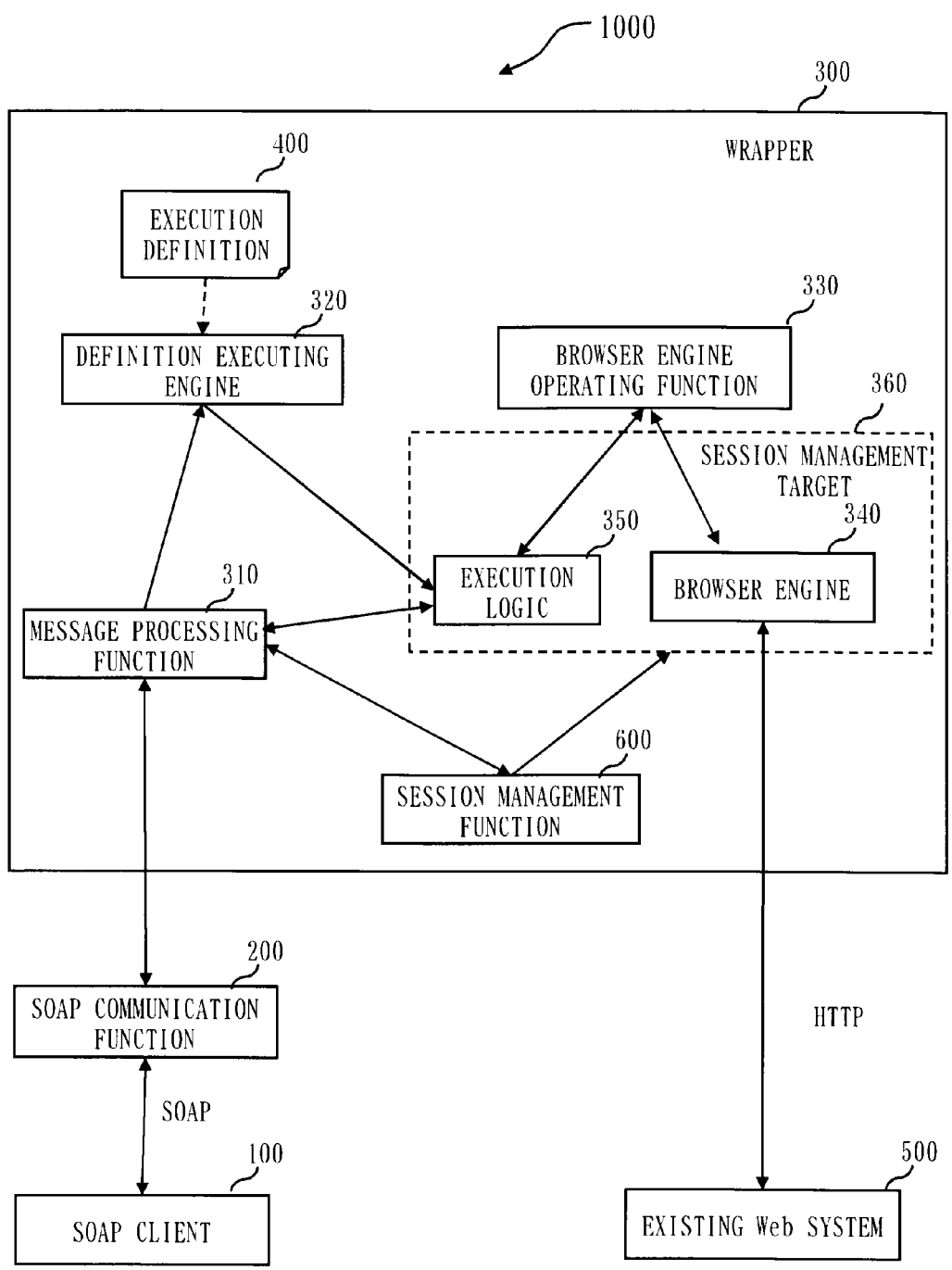
FIG. 21 is a configuration diagram of the Web wrapping system 1000 according to the third embodiment.

FIG. 21 is a configuration diagram of a Web wrapping system 1000 according to the third embodiment. In FIG. 21, the system configuration is the same as the first embodiment of FIG. 3 except for an execution logic 350, a session management target 360, and a session management function 600.
(1) The execution logic 350 is an instance of the user operation logic when the execution definition 400 is executed by the definition executing engine 320. In the following explanation, although the execution logic 350 is explained as the operating subject, exactly, as well as the definition executing engine 320 of the first embodiment, the execution logic 350 issues the operating request to the browser engine operating function 330 (the browser operation instructing signal), and the following operation is executed by operating the browser engine with the browser engine operating function 330 which receives the operating request. Namely, the execution logic 350 executes the operation which will be explained below through the browser engine operating function 330 and the browser engine.
(2) The session management target 360 is an object to be managed by a session management function 600.
(3) The session management function 600 is a function to identify sessions of SOAP communication and manage variables for each session.

(Screens of the Existing Web System 500)

Figure 22:
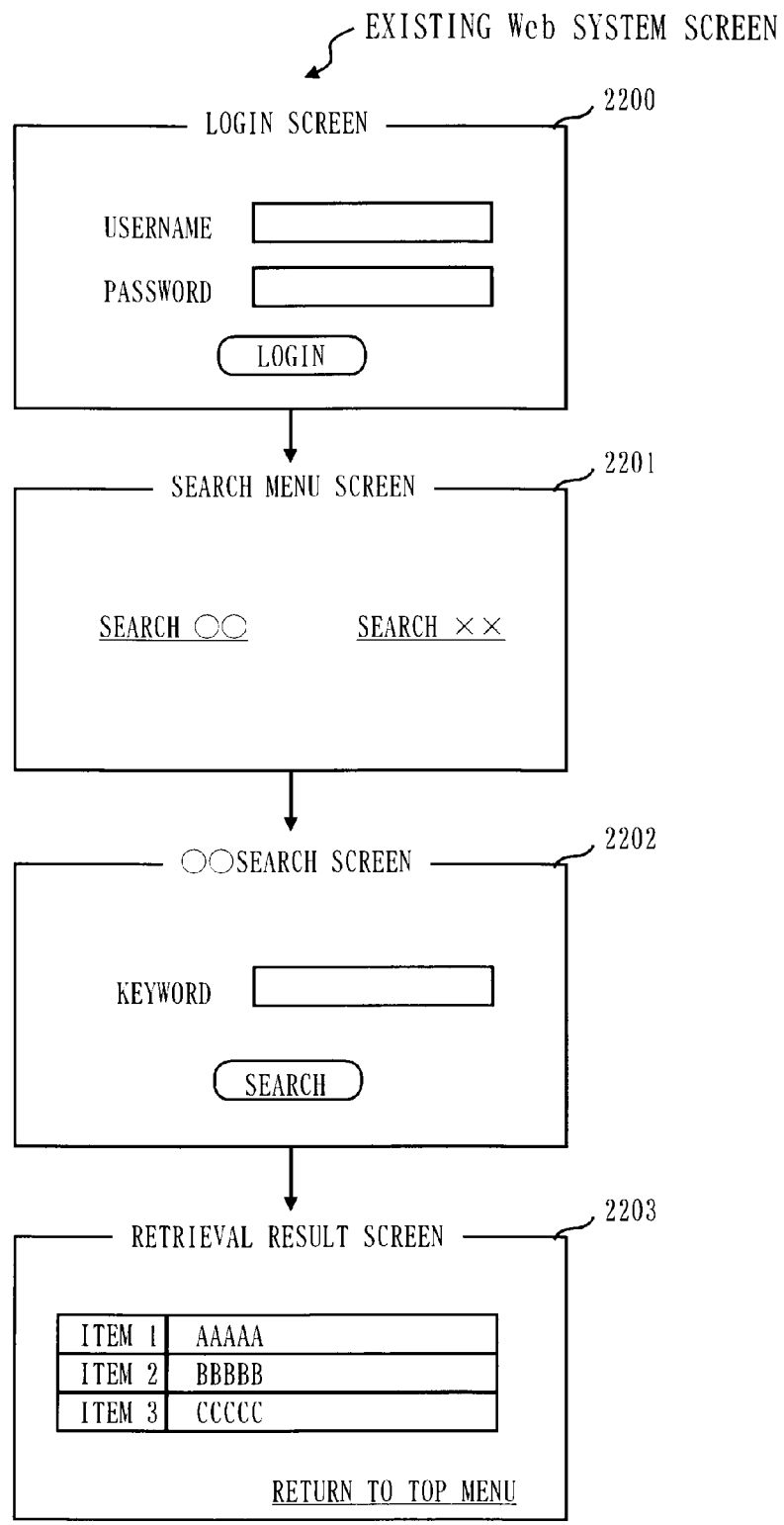
FIG. 22 shows a flow of user operation for the existing Web system 500 according to the third embodiment.

FIG. 22 shows a flow of user operation for the existing Web system 500 which is a target for wrapping in the third embodiment. In FIG. 22, by accessing "login screen 2200", inputting "username" and "password", clicking "login" by the user, the screen moves to "search menu screen 2201", and by clicking a figure of "oo search", the screen moves to "oo search screen 2202"; by inputting "keyword" and clicking a "search" button by the user, the screen moves to "retrieval result screen 2203", and the user can obtain values (BBBBB) of the second line, the second column in the table.

(Execution Definition 400)

FIG. 23 shows contents of the execution definition 400 which defines user operation in the flow of user operation which has been explained in FIG. 22. In the execution definition 400, the operation name is "operation3", the parameters are "username", "password", and "keyword". "Username" and "password" are to be a username and a password for user authentication, and "keyword" is to be a keyword for search. "Operation3 (username, password, keyword)" which is to be operation definition of the Web service operation defines the operation of the following (1) through (3).
(1) If no browser engine exists, generate a browser engine, and open URL of search screen using the generated browser engine.
(2) When the login screen is displayed, by inputting the username and the password, the screen is moved to the search screen, and by inputting the keyword, the search is carried out.
(3) From a table of retrieval result, values of the second line, the second column are extracted and returned.

Next, the operation will be explained with reference to flowcharts of FIGS. 24 through 28 and a sequence diagram of FIG. 29. FIG. 29 shows the operation of each flowchart as a sequence (steps S11 through S16), which shows the operation before starting the operation of execution logic. The operations are the same as the first embodiment except for the operation of the SOAP communication function 200, the message processing function 310, the definition executing engine 320, the execution logic 350, and the session management function 600.

(SOAP Communication Function 200)

Figure 24:
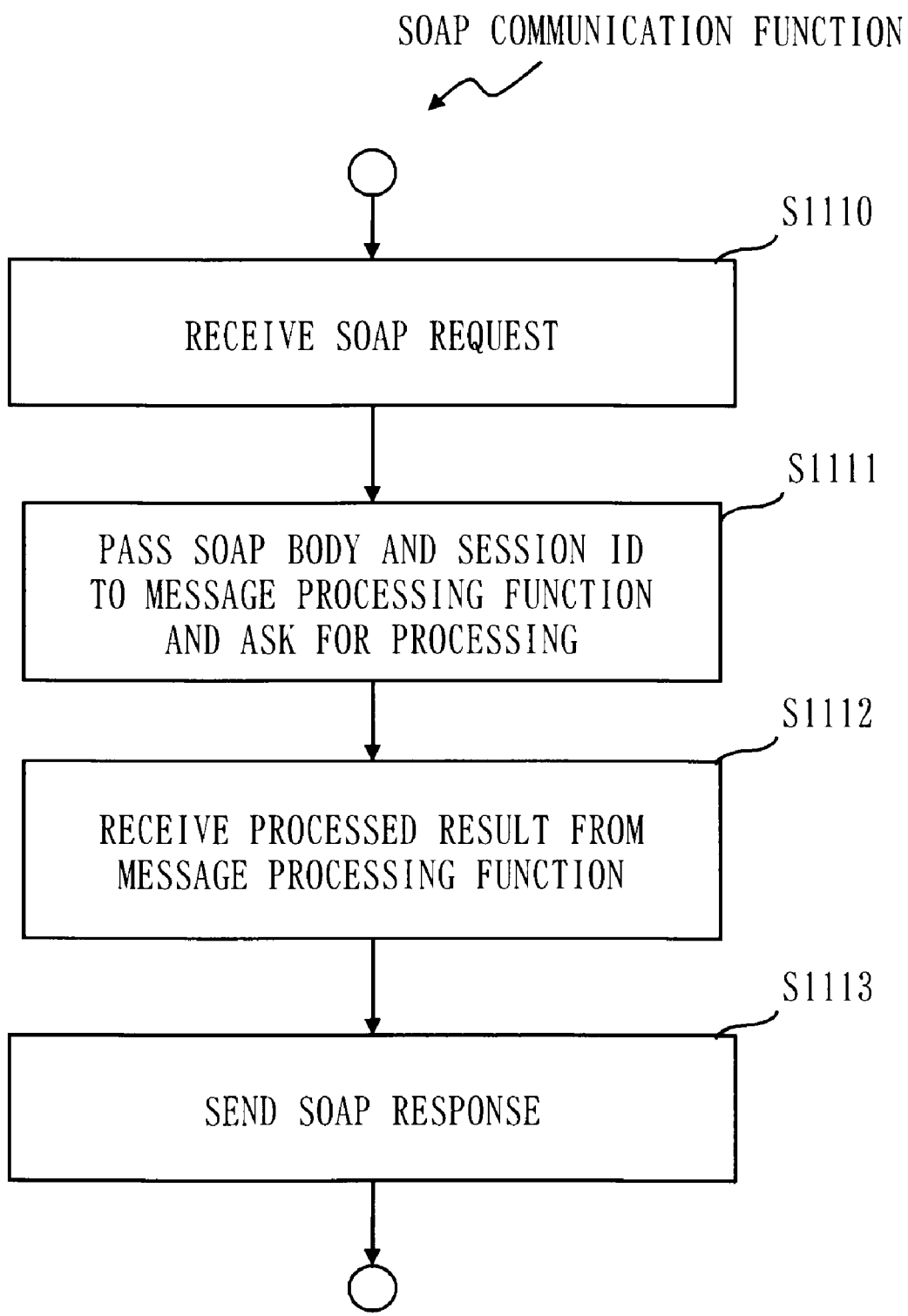
FIG. 24 is a flowchart of a SOAP communication function 200 according to the third embodiment.

FIG. 24 is a flowchart showing the operation of the SOAP communication function 200. As shown in FIG. 24, the SOAP communication function 200 receives SOAP messages from the SOAP client 100 (S1110, S11), and sends a processing request together with the SOAP body of the SOAP message and "session ID" to the message processing function 310 (S1111, S12). On receiving the processed result from the message processing function 310 (S1112), the SOAP communication function 200 sends the processed result (SOAP response) to the SOAP client 100 (S1113).

(Message Processing Function 310)

Figure 25:
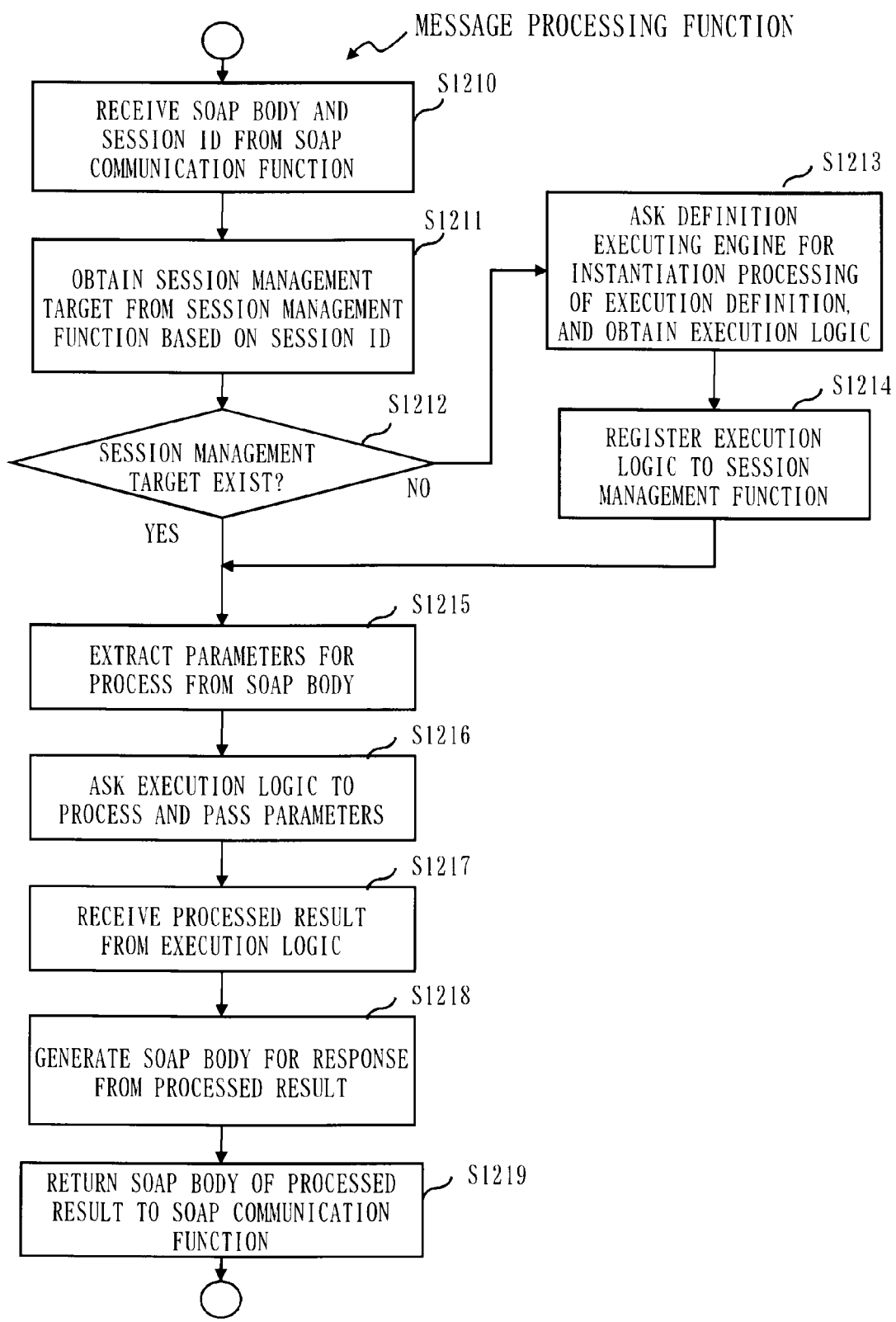
FIG. 25 is a flowchart of a message processing function 310 according to the third embodiment.

FIG. 25 is a flowchart showing the operation of the message processing function 310. As shown in FIG. 25, the message processing function 310 obtains a session management target 360 from the session management function 600 (S1211, S13) based on the session ID received from the SOAP communication function 200 (S1210). Namely, the message processing function 310 sends an obtaining request of the execution logic 350 corresponding to the session ID out of the session management target 360 managed by the session management function 600 together with the session ID to the session management function 600. As a result of the obtaining request, if no session management target 360 exists in the session management function 600 (S1212), the message processing function 310 outputs a generation processing request (a request for instantiation of the execution definition) for requesting the definition executing engine 320 to generate the execution logic 350, obtains the execution logic 350 from the definition executing engine 320 (S1213, S14), and as well registers the execution logic 350 obtained in the session management function 600 (S1214, S15). Further, the message processing function 310 extracts the values to be parameters for the Web service operation from the SOAP body received from the SOAP communication function 200 and passes to the execution logic 350 together with the processing request (S1215, S1216, S16). On receiving the processed result from the execution logic 350 (S1217), the message processing function 310 generates a SOAP body for response from the processed result (S1218) and returns the SOAP body generated to the SOAP communication function 200.

(Session Management Function 600)

Figure 26:
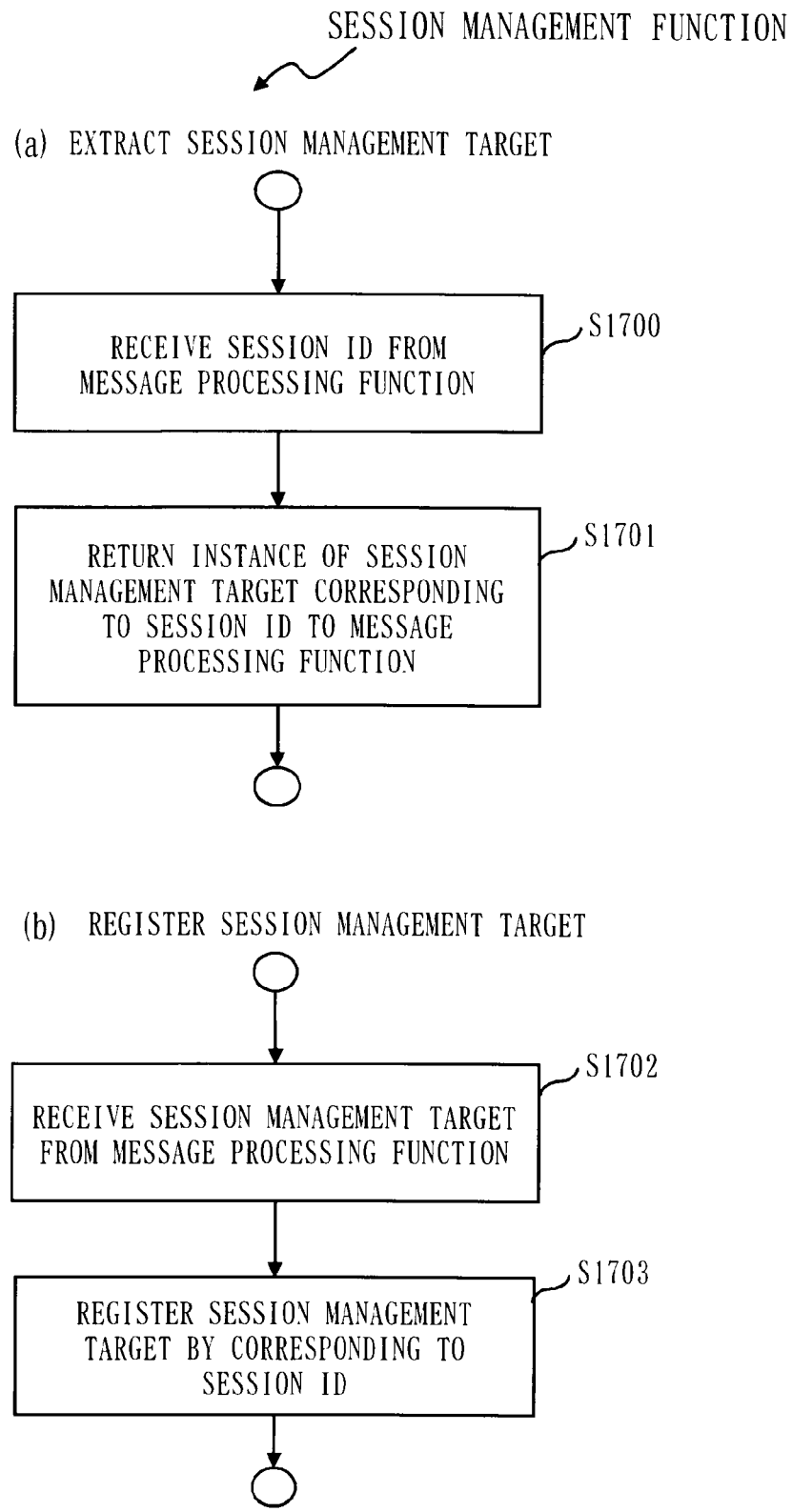
FIG. 26 is a flowchart of a session management function 600 according to the third embodiment.

FIG. 26 is a flowchart showing the operation of the session management function 600. As discussed above, the session management function 600 returns an instance (a set of the execution logic 350 and its corresponding browser engine instance) of the session management target 360 (S1701) corresponding to "session ID" received from the message processing function 310 (S1700). Further, on receiving the session management target 360 from the message processing function 310 (S1702), the session management function 600 registers the session management target 360 received (S1703).

(Definition Executing Engine 320)

Figure 27:
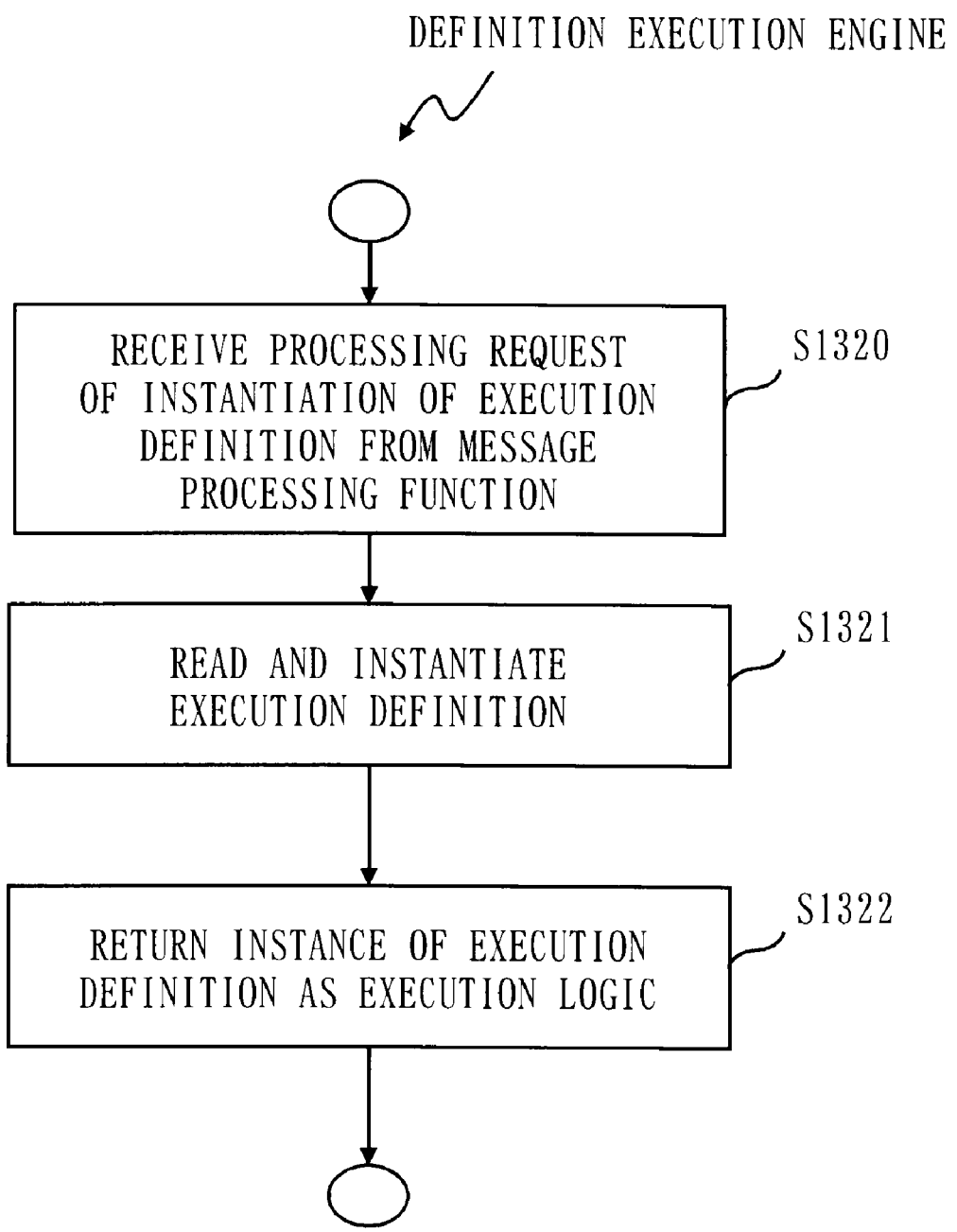
FIG. 27 is a flowchart of a definition executing engine 320 according to the third embodiment.

FIG. 27 is a flowchart showing the operation of the definition executing engine 320. As discussed, the definition executing engine 320 reads the execution definition 400 corresponding to the generation processing request of the execution logic 350 received from the message processing function 310 (S1320), generates a user operation logic part as the execution logic 350 (S1321), and returns to the message processing function 310 (S1322).

(Execution Logic 350)

Figure 28:
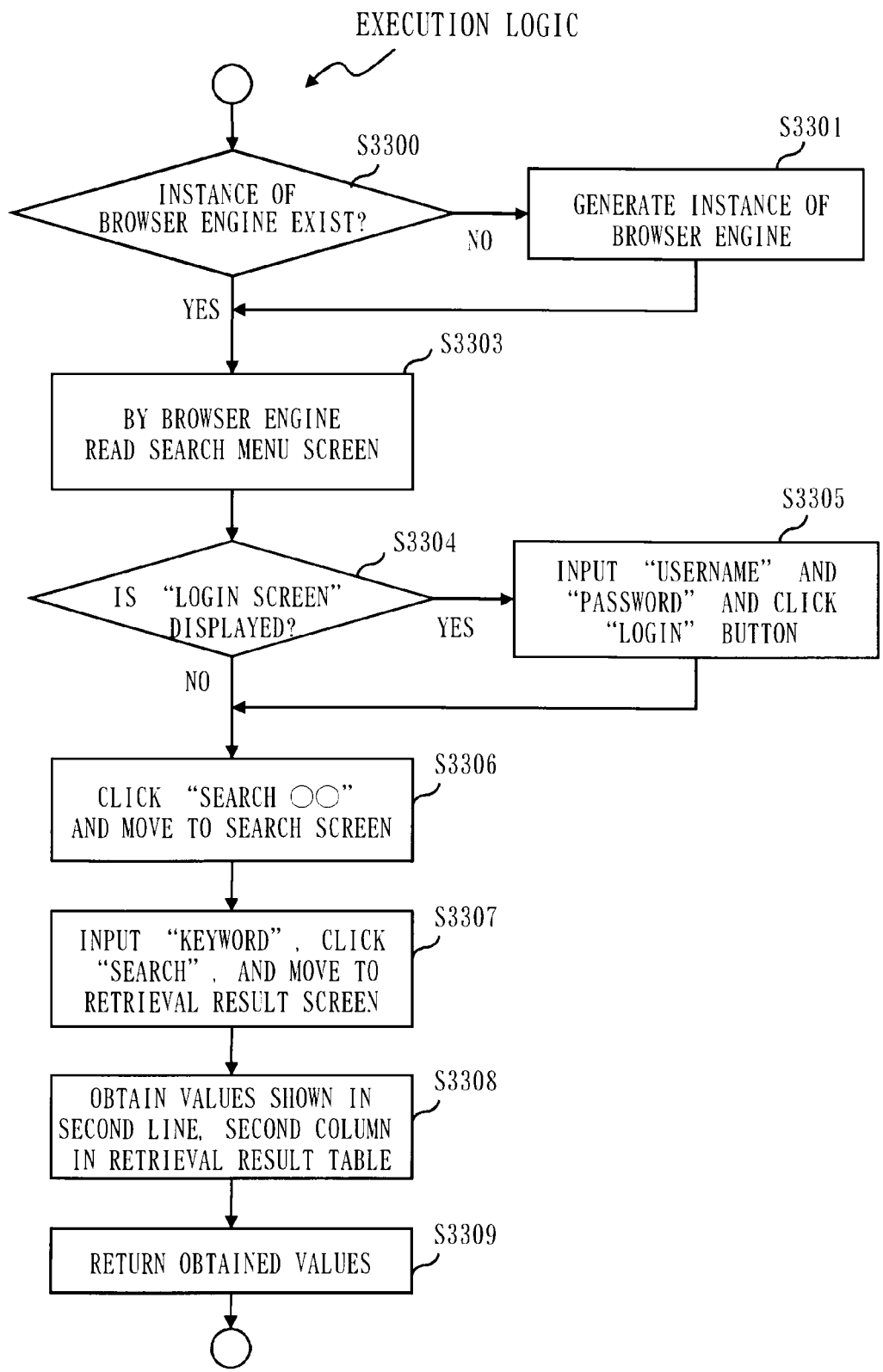
FIG. 28 is a flowchart of an execution logic 350 according to the third embodiment.
Figure 29:
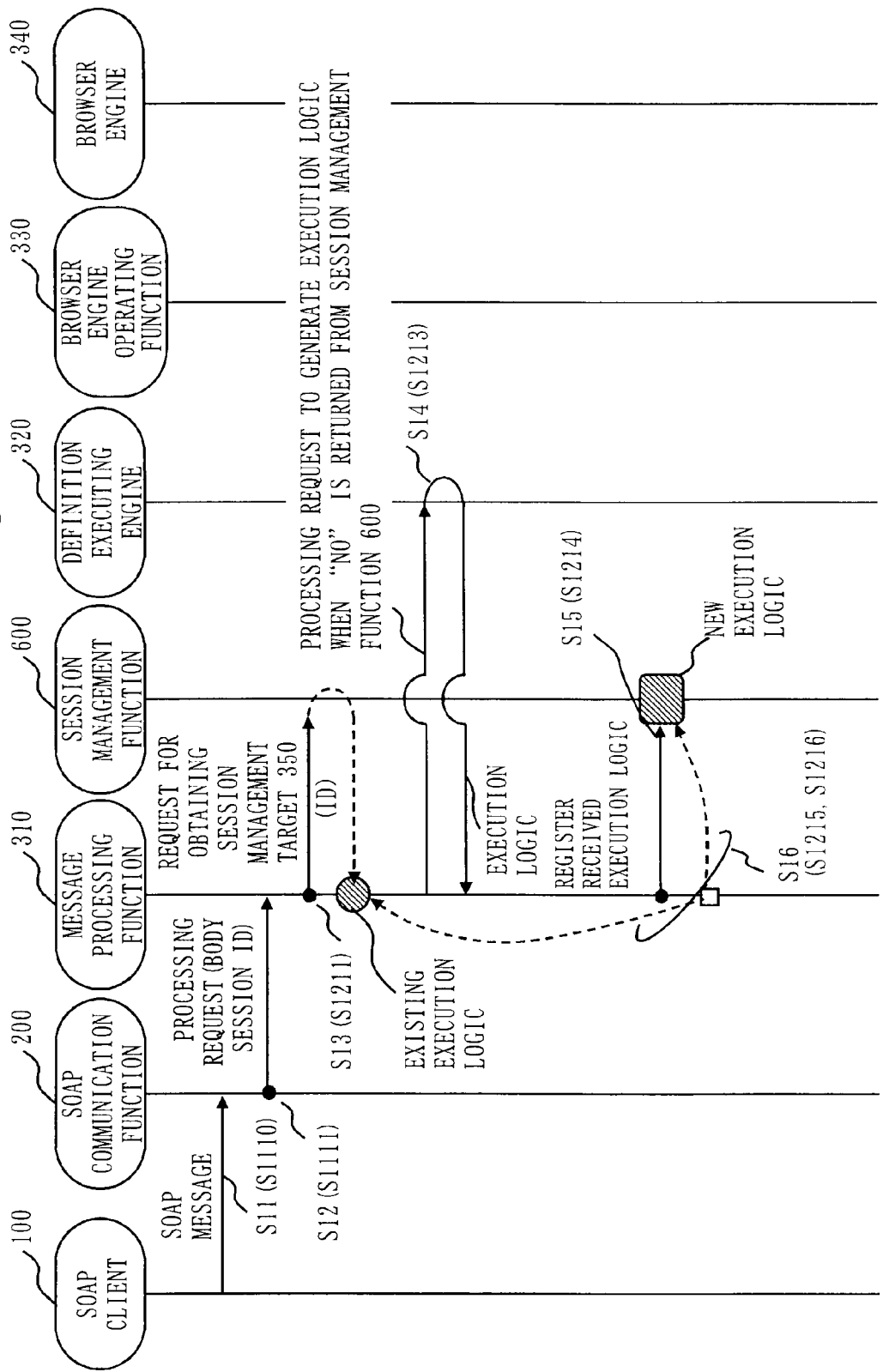
FIG. 29 is a sequence showing an operation of the wrapper 300 according to the third embodiment.

FIG. 28 is a flowchart showing the operation of the execution logic 350. The execution logic 350 executes the operation of the flowchart shown in FIG. 28 according to the operational contents defined in the execution definition 400. First, the execution logic 350 confirms if the instance of the browser engine 340 exists or not (S3300), and if no instance exists, generates an instance of the browser engine 340 (S3301). The execution logic 350 reads the search menu screen using the browser engine 340 (S3303), if the screen displayed is "login screen" (S3304), the execution logic 350 logins by inputting "username" and "password" (S3305). Up to this operation, the browser engine 340 displays the search menu screen.

Next, when the execution logic 350 clicks "search oo", the screen moves to the search screen (S3306), and when the execution logic 350 inputs "keyword" and clicks the "search" button, the screen moves to the retrieval result screen (S3307). The execution logic 350 obtains the values displayed in the second line, the second column in the table of the retrieval result (S3308) and returns it (S3309). This operation reproduces the flow of the above user operation shown in FIG. 22.

As discussed above, the session management function 600 manages the execution logic 350 and the browser engine 340 as the session management target 360, so that it is possible to wrap and serve with maintaining the processes separate for each user even if the existing Web system 500 requires the user authentication. Further, by instantiating only a part of the flow of the user operation as the execution logic, it is possible to save the resource even if the number of the users is large.

Embodiment 4

Next, the fourth embodiment will be explained with reference to FIGS. 30 through 33. In the above third embodiment, the user authentication is necessary and a flow of screens of the existing Web system 500 is single and simple. On the contrary, the following fourth embodiment will show a case in which the user authentication is necessary and the flow of screens is separated in plural flows, and a wrapping is done for the user operation including respective flows.

(System Configuration)

Figure 30:
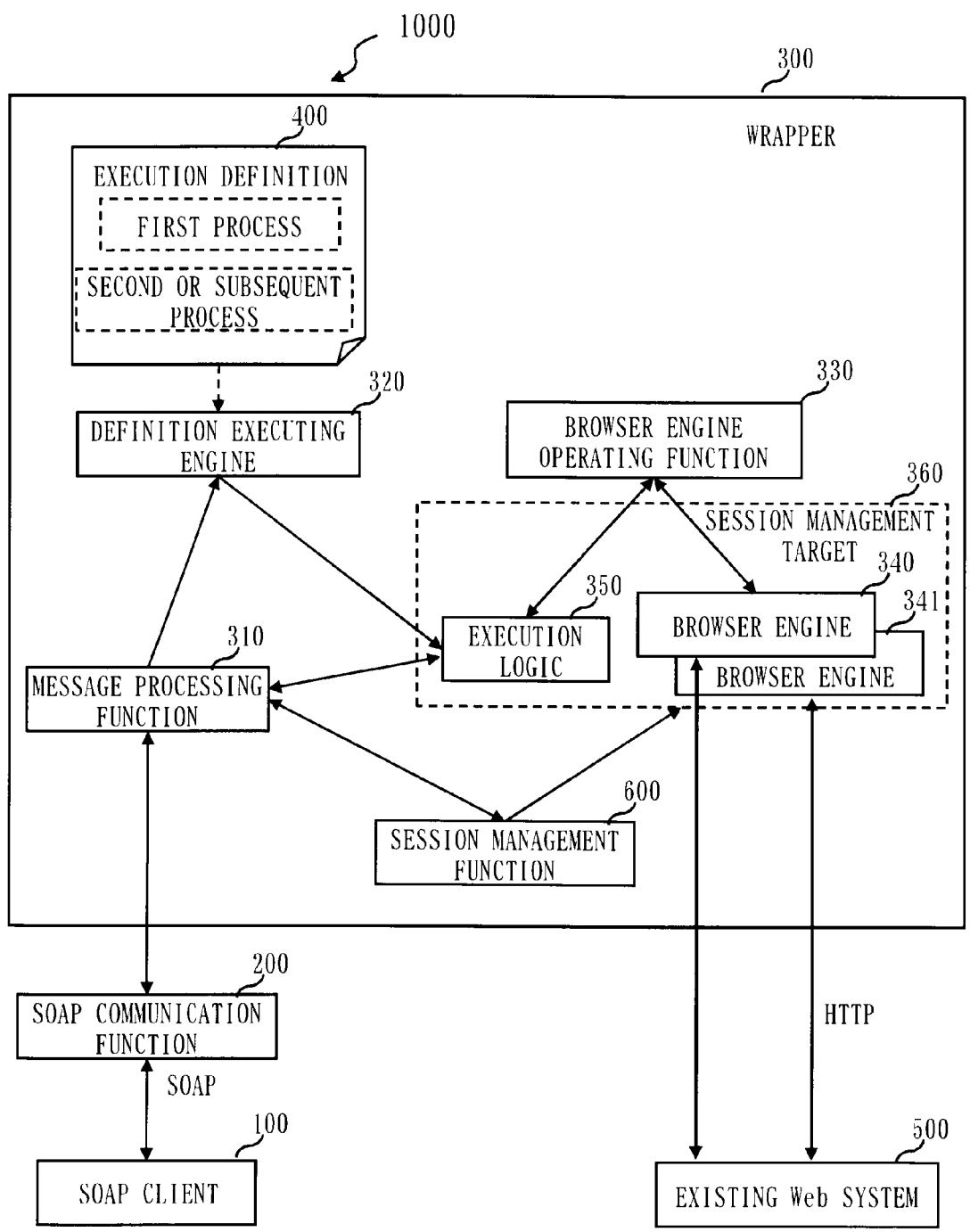
FIG. 30 is a configuration diagram of the Web wrapping system 1000 according to the fourth embodiment.

FIG. 30 is a configuration diagram of a Web wrapping system 1000 according to the fourth embodiment. In FIG. 30, the system configuration is the same as the third embodiment shown in FIG. 21 except for the execution definition 400 and the browser engine 341.

(1) The execution definition 400 describes a process in response to the first processing request (corresponding to the initialization) and a process in response to the second or subsequent processing request.

(2) The browser engine 341 is a function to access the existing Web system 500 to conduct HTTP communication; the browser engine 341 has equivalent function to the browser engine 340.

(Screen of Existing Web System 500)

Figure 31:
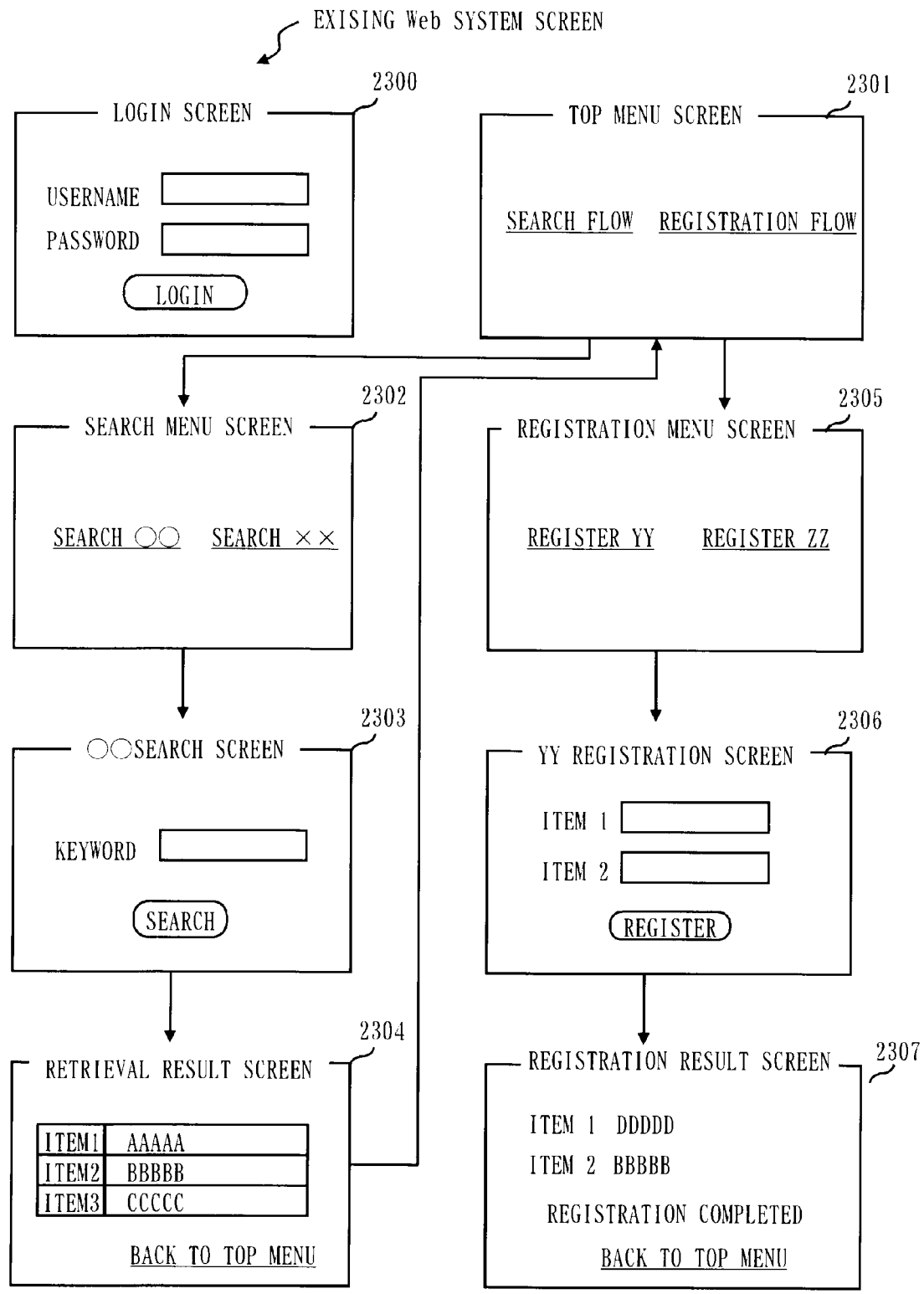
FIG. 31 shows a flow of user operation for the existing Web system 500 according to the fourth embodiment.

FIG. 31 is a flow of "user operation" of the existing Web system 500 which is a target for wrapping in the fourth embodiment. In FIG. 31, (1) when the user accesses "login screen 2300", inputs "username" and "password", and clicks "login", the screen moves to "top menu screen 2301";

(2) when the user clicks "search flow", the screen moves to "search menu screen 2302";

(3) when the user clicks "search oo", the screen moves to "oo search screen 2303";

(4) when the user inputs "keyword" and clicks "search" button, the screen moves to "retrieval result screen 2304", and the user obtains values (BBBBB) of the second line, the second column in the table.

(5) Then, the user clicks "back to top menu", the screen moves to "top menu screen 2301";

(6) when the user clicks "registration flow", the screen moves to "registration menu screen 2305";

(7) when the user clicks "register yy", the screen moves to "yy registration screen 2306";

(8) when the user inputs "item 1", inputs the values obtained in the retrieval result screen in "item 2", and clicks the "register" button, the screen moves to "registration result screen 2307", and the user wants to obtain "registration result screen 2307" through the above operation.

(Execution Definition 400)

In the execution definition 400 shown in FIG. 32, "user operation" in the flow of "user operation" discussed in FIG. 31 is defined by separating into "the first processing request" and "the second or subsequent processing request". In the execution definition 400 of FIG. 32, "operation4 (username, password, keyword, info)", which is the operation definition of the Web service operation, is separated by a flag "flg_init" into the first processing request (flg_init=false) and the second or subsequent processing request.

(First Processing Request Definition; Second or Subsequent Processing Request Definition)

In the definition of the first processing request, in addition to the above flow of user operation, it is defined that when the browser engine displays "oo search screen 2303", the browser engine operating function 330 stores a clone in "scr_search", and when the browser engine displays "yy registration screen 2306", the browser engine operating function 330 stores a clone in "scr_regist". Further, the definition of the second or subsequent processing request defines "operation of search and registration" using the clones of browser engines "scr_search" and "scr_regist". The operation name is "operation4". The parameters are "username", "password", "keyword", and "info". "Username" and "password" are a username and a password used for user authentication, "keyword" is a keyword for search, and "info" is information to be registered as an item 2.

Next, the operation will be explained. The operation is the same as the third embodiment except for the operation of the execution logic 350. With reference to a flowchart of FIG. 33, the operation of the execution logic of the fourth embodiment will be explained.

(Execution Logic 350)

Figure 33:
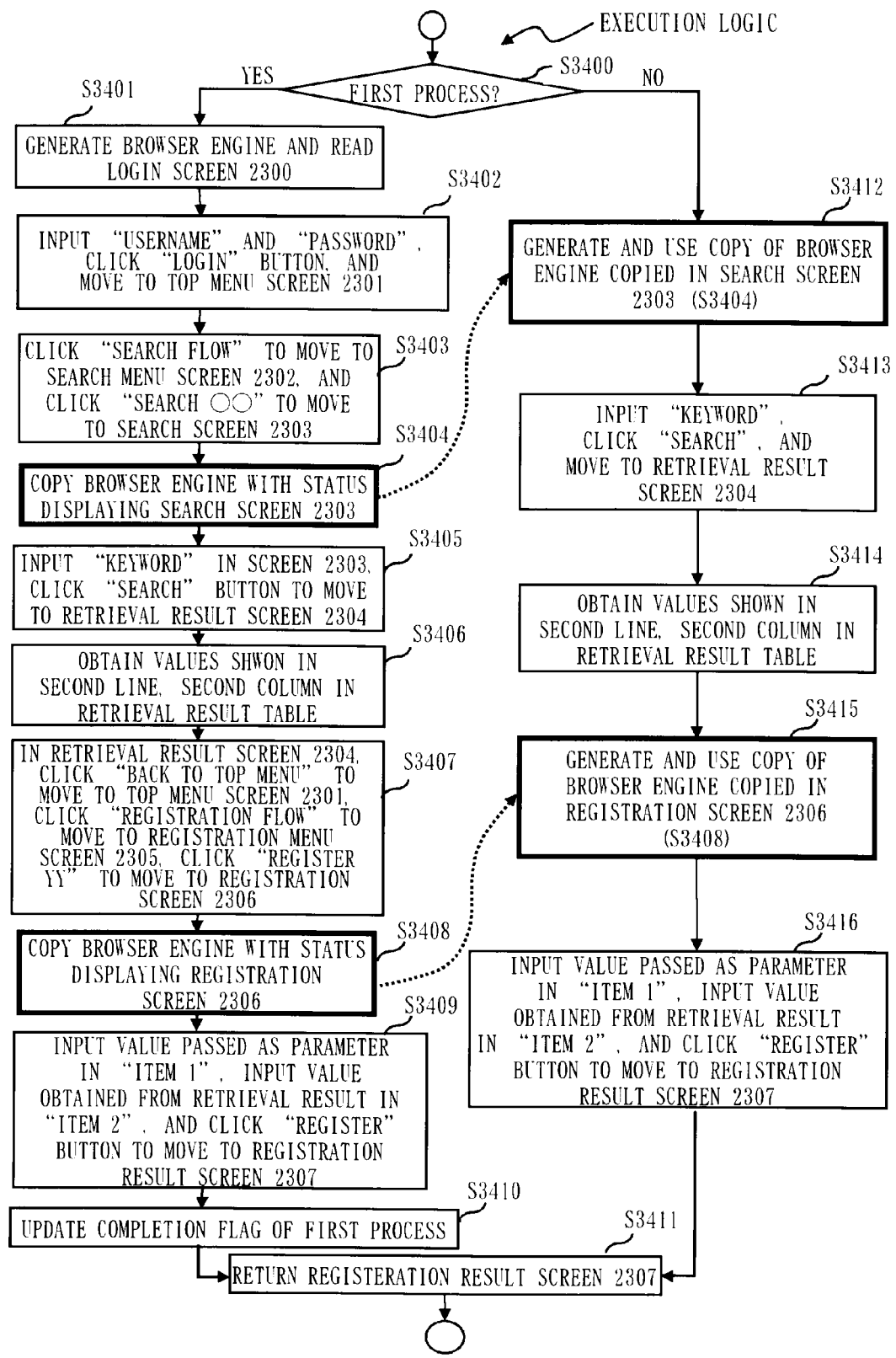
FIG. 33 is a flowchart of an execution logic 350 according to the fourth embodiment.

FIG. 33 is a flowchart showing the operation of the execution logic 350. The execution logic 350 carries out the operation of the flowchart shown in FIG. 33 according to the operational contents defined in the execution definition 400. In the following explanation, although the execution logic 350 is explained as the operating subject, exactly, as discussed in the third embodiment, the execution logic 350 issues a processing request to the browser engine operating function 330, and the following operation is executed by operating the browser engine with the browser engine operating function 330 which receives the processing request. Namely, the execution logic 350 executes the operation which will be explained below through the browser engine operating function 330 and the browser engine.

("First Process" in Execution Definition 400)

(1) First, the execution logic 350 determines if the processing request is the first time or not (S3400), and if it is the first time, the execution logic 350 generates the browser engine to read "login screen 2300" (S3401).

(2) The execution logic 350 inputs "username" and "password", and the screen moves to "top menu screen 2301" by clicking "login button" (S3402).

(3) Then, the execution logic 350 clicks "search flow", and the screen moves to "search menu screen 2302".

(4) The execution logic 350 clicks "search oo" in "search menu screen 2302", and the screen moves to "oo search screen 2303" (S3403). Up to this process, "oo search screen 2303" is displayed on the browser engine, and the execution logic 350 (the browser engine operating function 330) copies the browser engine of this status as the browser engine 340 (S3404).

(5) Subsequent to "oo search screen 2303", the execution logic 350 inputs "keyword" and clicks "search" button. The screen moves to "retrieval result screen 2304" (S3405). The execution logic 350 obtains values shown in the second line, the second column in the retrieval result table (S3406).

(6) The execution logic 350 clicks "back to the top menu" in "retrieval result screen 2304", and the screen moves to "top menu screen 2301".

(7) Then, the execution logic 350 clicks "registration flow", and the screen moves to "registration menu screen 2305".

(8) The execution logic 350 clicks "register yy", and the screen moves to "yy registration screen 2306" (S3407). Up to this process, "yy registration screen 2306" is displayed on the browser engine, and the execution logic 350 (the browser engine operating function 330) copies the browser engine of this status as the browser engine 341 (S3408).

(9) Subsequently, the execution logic 350 inputs values which are passed as the parameters in "item 1", inputs the values obtained at S3406 in "item 2" and clicks "register" button, and the screen moves to "registration result screen 2307" (S3409).

(10) The execution logic 350 updates the completion flag of the first process (S3410), and returns "registration result screen 2307" (S3411).

(Second or Subsequent Process)

Next, if the processing request is the second or subsequent time (S3400), the execution logic 350 (the browser engine operating function 330) generates a copy of the browser engine 340 (S3412). "The copy" generated here is the second copy (a copy of the copy) generated by copying the copy (referred to as the first copy) of the browser engine in the displaying status of "oo search screen 2303" generated at S3404 as an original. This is because if "the first copy" is used instead of the second copy, "the first copy" cannot be used in the process of the third time, the fourth time, etc. Namely, in the second or subsequent process, "the second copy" is generated and used using "the first copy" as the original. The execution logic 350 inputs the "keyword" using the browser engine (the second copy with displaying "oo search screen 2303"), clicks "search" button, the screen moves to "retrieval result screen 2304" (S3413), and the execution logic 350 obtains values shown in the second line, the second column in the table of the retrieval result (S3414).

In the foregoing explanation, the wrapper 300 uses the copy of the browser engine instance generated at "the first process" (an example of the first process) at "the second process" (an example of the second process); however, it is, needless to say, possible to use the copy at "the third process" (an example of the second process) or at "the fourth process" (an example of the second process). Further, the copy of the browser engine instance generated at "the second process" (an example of the first process) can be used at the subsequent process, for example, "the third process" (an example of the second process).

Subsequently, the execution logic 350 (the browser engine operating function 330) generates a copy of the browser engine 341 (S3415). "The copy" generated here is, similarly to S3412, the second copy (a copy of the copy) generated by copying the copy of the browser engine with displaying "oo search screen 2303" (the first copy) generated at S3408 as an original. The reason is the same as the case of S3412. The execution logic 350 inputs values which are passed as the parameters in "item 1" using the browser engine, and at the same time, the execution logic 350 inputs the values obtained at S3414 in "item 2", clicks the "register" button, and the screen moves to "registration result screen 2307" (S3416). Finally, the execution logic 350 returns "registration result screen 2307" (S3411). By the above-discussed processes, the flow of the above user operation is reproduced.

As has been discussed, by separating the definition into the first process and the second or subsequent process, copying and using at the second or subsequent process the browser engine copied at the first process, it is possible to wrap and serve the user operation including respective flows in the flow, which requires the user authentication, separated into plural flows. Further, by copying the browser engine at the first process with an optimal status, which eliminates unnecessary screen transition at the time of processing request as a service, the processing speed can be improved. As well as the third embodiment, only part of the flow of the user operation is instantiated as the execution logic, so that it is possible to save the resource even if the number of users is large. Here, even if the flow of screens is single and there exists a screen for which reading requires time in the midstream, it is also possible to speed-up the second or subsequent process by using the first process.

In the above embodiments, the Web system wrapping device (the user operation acting device) for wrapping the user operation of the existing Web system has been explained. This Web system wrapping device includes the browser engine for acting as the user operation, the browser engine operation function, and the definition execution engine for executing the execution definition which defines the user operation.

In the above embodiments, the following Web system wrapping device has been explained. Namely, in the execution definition of the above user operation acting, the initialization process for plural browser engines and the process using plural browser engines can be defined. Then, the definition execution engine carries out the execution definition.

In the foregoing embodiments, the following Web system wrapping device has been explained. Namely, the definition execution engine has a function to input the execution definition, to instantiate an execution logic part generated by the execution definition inputted, and further, the Web wrapping device includes a session management function for managing sessions of SOAP communication.

In the foregoing embodiments, the following Web system wrapping device has been explained. The browser engine operating function includes a function to copy the browser engine, and in the execution definition of the user operation acting, if the processing request is the first time, the operation process to copy the browser engine with a suitable status can be defined; and at the same time, if the processing request is the second or subsequent time, the operation process to use the browser engine copied at the first time process can be defined.

Having thus described several particular embodiments of the present invention, various alterations, modifications, and improvements will readily occur to those skilled in the art. Such alterations, modifications, and improvements are intended to be part of this disclosure, and are intended to be within the spirit and scope of the present invention. Accordingly, the foregoing description is by way of example only, and is not intended to be limiting. The present invention is limited only as defined in the following claims and the equivalents thereto.

The invention claimed is:

1. A user operation acting device comprising:
 a browser engine, implemented by a processor of the user operation acting device, that accesses a predetermined system device over a network;
 a browser engine operating unit for operating the browser engine to access the predetermined system device over a network according to a browser operation instructing signal;
 an execution logic that generates the browser operation instructing signal based on a definition of a user operation of a browser engine according to inputted parameters, and outputs the browser operation instructing signal generated to the browser engine operating unit,
 a session managing unit that stores and manages, as a session management target, a session identified by a session ID (IDentification) that defines an instance of the execution logic defining a user operation and a browser engine instance which is an instance of a browser engine executing the user operation of the execution logic;
 a processing request receiving unit that (i) receives a processing request from a client that includes parameters for requesting a process for the predetermined system device and the processing request including a session ID, (ii) requests the session managing unit to obtain the session management target managed by a same session ID as the session ID included in the processing request received, and when the session management target is obtained from the session managing unit, (iii) requests the execution logic included in the session management target obtained to perform a process,
 wherein the execution logic, which is requested to perform the process by the processing request receiving unit, generates the browser operation instructing signal based on a definition of a user operation of a browser engine according to the parameters included in the processing request, and outputs the browser operation instructing signal generated to the browser engine operating unit, and
 wherein the browser engine operating unit emulates a user operation of the browser engine for accessing the predetermined system device by inputting the browser operation instructing signal from the execution logic, and operates the browser engine instance obtained by the session managing unit according to the instruction of the browser operation instructing signal inputted.

2. The user operation acting device of claim 1,
 wherein the execution logic defines as the user operation at least a first process for the predetermined system device and a second process, in which a same browser engine instance as a browser engine instance used for the first process is used, to be executed after the first process, and
 wherein the browser engine operating unit copies the browser engine instance with a predetermined status in the first process and uses the browser engine instance copied for the second process.

3. The user operation acting device of claim 1, wherein the processing request is a SOAP (Simple Object Access Protocol) message.

4. The user operation acting device of claim 1, wherein the execution logic retrieves a search result provided by a search performed from the browser engine and returns the search result to the processing request receiving unit, and the process request receiving unit returns the search result to the client.

* * * * *